US008085502B2

(12) United States Patent
Jubert

(10) Patent No.: US 8,085,502 B2
(45) Date of Patent: Dec. 27, 2011

(54) WRITING AND READING MULTI-LEVEL PATTERNED MAGNETIC RECORDING MEDIA, WITH MORE THAN TWO RECORDING LEVELS

(75) Inventor: Pierre-Olivier Jubert, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 28 days.

(21) Appl. No.: 12/615,290

(22) Filed: Nov. 10, 2009

(65) Prior Publication Data

US 2011/0109987 A1  May 12, 2011

(51) Int. Cl.
*G11B 5/66* (2006.01)
(52) U.S. Cl. .................................................. 360/135
(58) Field of Classification Search .............. 360/55, 360/135, 59, 131, 65, 110; 430/1, 2; 427/130; 428/694, 611, 828, 212, 826, 827
See application file for complete search history.

(56) References Cited

U.S. PATENT DOCUMENTS

| | | | |
|---|---|---|---|
| 4,151,602 A | 4/1979 | Haisma et al. |
| 4,157,576 A | 6/1979 | Hack et al. |
| 4,520,076 A | 5/1985 | Saito et al. |
| 5,319,481 A | 6/1994 | Fergason |
| 5,319,501 A | 6/1994 | Mitsuhashi |
| 5,331,728 A | 7/1994 | Argyle et al. |
| 5,347,408 A | 9/1994 | Gohda et al. |
| 5,388,019 A | 2/1995 | Argyle et al. |
| 5,453,886 A | 9/1995 | Kobayashi et al. |
| 5,635,835 A | 6/1997 | Mouchot et al. |
| 5,851,643 A | 12/1998 | Honda et al. |
| 5,869,963 A | 2/1999 | Saito et al. |
| 5,912,783 A | 6/1999 | Ishida et al. |
| 5,958,541 A | 9/1999 | Miller et al. |
| 6,153,062 A | 11/2000 | Saito et al. |
| 6,322,933 B1 | 11/2001 | Daiber et al. |
| 6,352,621 B1 | 3/2002 | Saito et al. |

(Continued)

FOREIGN PATENT DOCUMENTS

JP  03272453 A  12/1991

(Continued)

OTHER PUBLICATIONS

Office Action (Mail Date Jun. 25, 2010) for U.S. Appl. No. 12/237,431, filed Sep. 25, 2008; First Named Inventor: Pierre-Olivier Jubert; Confirmation No. 9785.

(Continued)

*Primary Examiner* — Fred Tzeng
(74) *Attorney, Agent, or Firm* — Schmeiser, Olsen & Watts

(57) ABSTRACT

A method and apparatus for writing magnetization states in magnetic islands of a multi-level patterned magnetic recording medium with more than two recording levels and a method and apparatus for reading readback waveforms representing written magnetization states of the magnetic islands in the multi-level patterned magnetic recording medium. Writing each magnetization state includes selecting the magnetization state, determining a write current sufficient to write the magnetization state, and applying the write current to a magnetic write head to write the magnetization state, including simultaneously writing associated magnetic states in each magnetic island of at least one pair of magnetic islands. Reading the readback waveform representing a written magnetization state is implemented through use of a magnetic read head and includes: identifying the written magnetization state by decoding the readback waveform; and displaying and/or recording the written magnetization state.

20 Claims, 31 Drawing Sheets

U.S. PATENT DOCUMENTS

| | | | |
|---|---|---|---|
| 6,391,430 B1 | 5/2002 | Fullerton et al. | |
| 6,594,120 B2 | 7/2003 | Odagawa et al. | |
| 6,610,602 B2 * | 8/2003 | Gambino et al. | 438/689 |
| 6,620,532 B2 | 9/2003 | Aoyama | |
| 6,865,044 B1 | 3/2005 | Albrecht et al. | |
| 6,882,488 B1 | 4/2005 | Albrecht et al. | |
| 6,906,879 B1 * | 6/2005 | Albrecht et al. | 360/55 |
| 6,947,235 B2 * | 9/2005 | Albrecht et al. | 360/55 |
| 7,060,393 B2 | 6/2006 | Tsukamoto et al. | |
| 7,171,080 B2 | 1/2007 | Rausch | |
| 7,271,984 B2 | 9/2007 | Umeda et al. | |
| 7,282,278 B1 | 10/2007 | Nolan | |
| 7,355,884 B2 | 4/2008 | Nakayama et al. | |
| 7,477,490 B2 | 1/2009 | Gao et al. | |
| 7,518,907 B2 | 4/2009 | Nakayama et al. | |
| 7,911,739 B2 | 3/2011 | Jubert | |
| 2005/0053803 A1 | 3/2005 | Umeda et al. | |
| 2005/0084715 A1 | 4/2005 | Hee et al. | |
| 2005/0122609 A1 | 6/2005 | Albrecht et al. | |
| 2006/0177702 A1 | 8/2006 | Ajan | |
| 2006/0222896 A1 | 10/2006 | Inomata et al. | |
| 2006/0249391 A1 * | 11/2006 | Jin | 205/118 |
| 2007/0218317 A1 | 9/2007 | Kurita et al. | |
| 2008/0002296 A1 | 1/2008 | Umeda et al. | |
| 2008/0063901 A1 | 3/2008 | Nakayama et al. | |
| 2008/0085424 A1 | 4/2008 | Dobin et al. | |
| 2008/0226817 A1 | 9/2008 | Lee | |
| 2009/0080109 A1 | 3/2009 | Fukuzawa et al. | |
| 2009/0140358 A1 | 6/2009 | Nakayama et al. | |
| 2009/0154219 A1 * | 6/2009 | Hellwig et al. | 365/130 |
| 2010/0020437 A1 | 1/2010 | Dobin et al. | |
| 2010/0053811 A1 | 3/2010 | Takeshita | |
| 2010/0073814 A1 * | 3/2010 | Jubert | 360/110 |
| 2010/0075178 A1 * | 3/2010 | Jubert | 428/800 |
| 2011/0109984 A1 | 5/2011 | Jubert | |

FOREIGN PATENT DOCUMENTS

| | | | |
|---|---|---|---|
| JP | 11328645 A | 11/1999 | |

OTHER PUBLICATIONS

Office Action (Mail Date Jul. 9, 2010) for U.S. Appl. No. 12/236,589, filed Sep. 24, 2008; First Named Inventor: Pierre-Olivier Jubert; Confirmation No. 8200.

U.S. Appl. No. 12/237,431, filed Sep. 25, 2008; First Named Inventor Pierre-Olivier Jubert; Confirmation No. 9785.

U.S. Appl. No. 12/236,589, filed Sep. 24, 2008; First Named Inventor Pierre-Olivier Jubert; Confirmation No. 8200.

U.S. Appl. No. 12/615,375, filed Nov. 10, 2009; First Named Inventor Pierre-Olivier Jubert; Confirmation No. 1466.

Office Action (Mail Date Nov. 29, 2010) for U.S. Appl. No. 12/236,589, filed Sep. 24, 2008; Confirmation No. 8200.

Notice of Allowance (Mail Date Nov. 15, 2010) for U.S. Appl. No. 12/237,431, filed Sep. 25, 2008; Confirmation No. 9785.

USPTO Office Action (Mail Date Feb. 24, 2011) for U.S. Appl. No. 12/615,375, filed Nov. 10, 2009; Confirmation No. 1466.

U.S. Appl. No. 13/028,582, filed Feb. 16, 2011; Confirmation No. 9063.

Notice of Allowance (Mail Date May 31, 2011) for U.S. Appl. No. 12/615,375, filed Nov. 10, 2009; Confirmation No. 1466.

Office Action (Mail Date May 25, 2011) for U.S. Appl. No. 13/028,582, filed Feb. 16, 2011; Confirmation No. 9063.

Office Action (Mail Date Apr. 4, 2011) for U.S. Appl. No. 12/236,589, filed Sep. 24, 2008; Confirmation No. 8200.

* cited by examiner

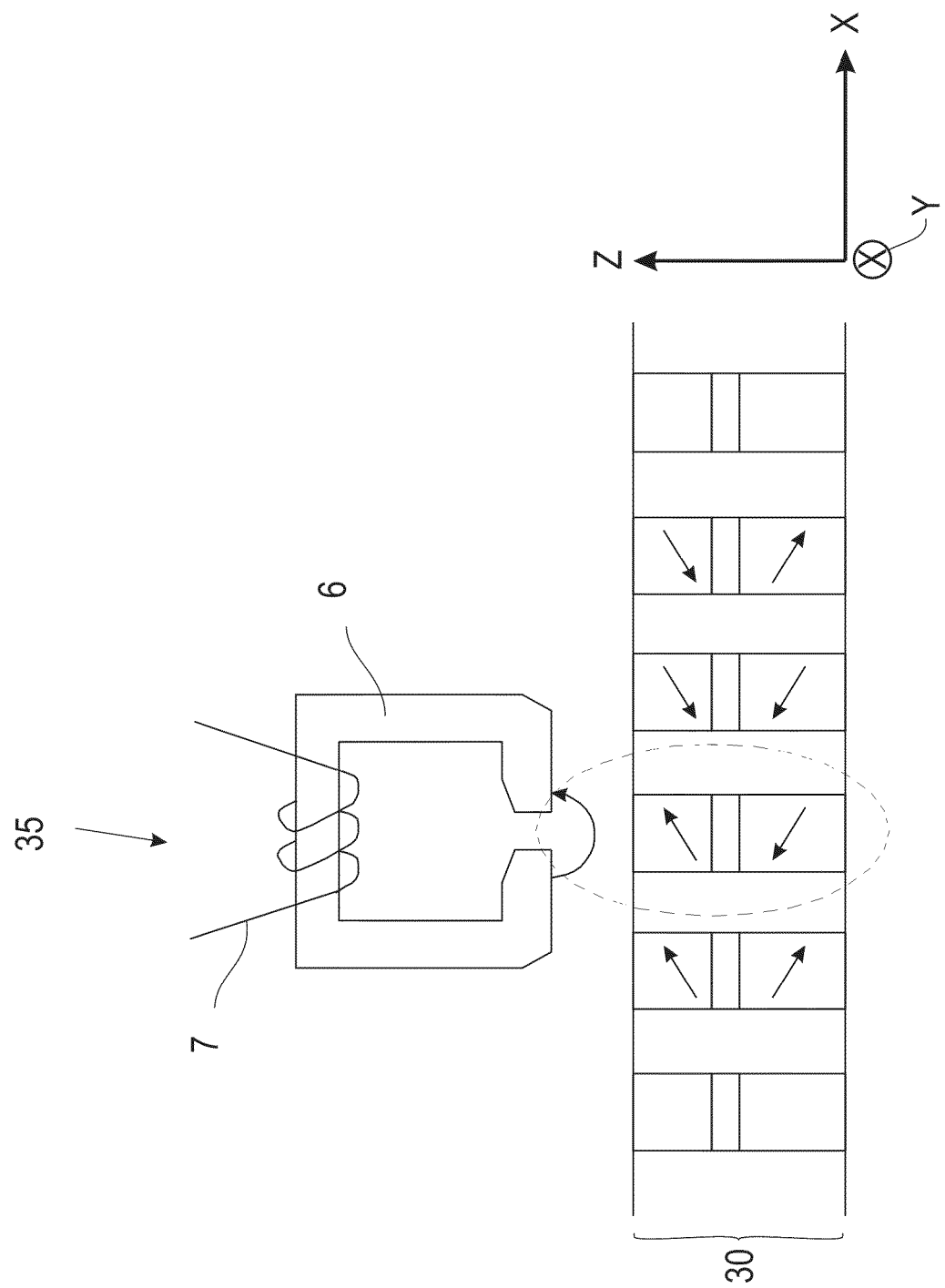

WRITING AND READING MULTI-LEVEL PATTERNED MAGNETIC RECORDING MEDIA, WITH MORE THAN TWO RECORDING LEVELS

FIELD OF THE INVENTION

The present invention relates to writing and reading multi-level patterned magnetic recording media.

BACKGROUND OF THE INVENTION

Patterned magnetic recording media are under consideration for being used for recording bits of data thereon. A patterned medium for magnetic recording comprises isolated islands such that the magnetization is uniform in each island. A patterned recording medium may be formed by patterning a thin-film layer. With conventional magnetic recording, however, there are limitations on the achievable recording density and on the efficiency of writing bits of data on the patterned magnetic recording media.

SUMMARY OF THE INVENTION

The present invention provides a method for writing magnetization states in a multi-level patterned magnetic medium comprising a plurality of pillars distributed in an X direction and a Y direction which are orthogonal to each other and define an X-Y plane, consecutive pillars of the plurality of pillars separated by non-magnetic material, each pillar comprising N magnetic islands distributed along a Z direction orthogonal to the X-Y plane, said N magnetic islands denoted as L(1), L(2), ..., L(N), said N at least 3. said method comprising:

selecting M island groups denoted as G(1), G(2), ..., G(M) from the N magnetic islands in a first pillar of the plurality of pillars, said M island groups consisting of P island pairs and Q single islands, wherein $2 \leq M \leq N-1$. $P \geq 1$. and $Q \geq 0$;

selecting magnetization states S(1), S(2), ..., S(M) corresponding to the island groups G(1), G(2), ..., G(M), respectively, for each island group G(m) (m=1, 2, .... or M) consisting of an island pair, the magnetization state S(m) is denoted as [S1; S2](m), wherein S1 and S2 are a first and second magnetic state in a first and second magnetic island, respectively, of the island pair, wherein $\alpha_1^*$ and $\alpha_2^*$ are a first tilt angle and a second tilt angle at which a hard axis of the first magnetic island and the second magnetic island are respectively oriented with respect to the X direction, and wherein either or both of $\alpha_1^*$ and $\alpha_2^*$ i are in a range of 0 to −90 degrees;

for each island group G(m') (m'=1, 2, ..., or M) consisting of a single island, the magnetization state S(m') is +1 or −1 if the magnetization is oriented at or opposite to, respectively, a tilt angle ($\alpha$) at which an easy axis of the single island is oriented with respect to the X direction;

determining write currents I(1), I(2), ..., I(M) sufficient to write the magnetization states S(1), S(2), ..., S(M), respectively;

for a set of indexes $\{i_1, i_2 ..., i_M\}$ such that each index maps to a unique integer in the set of integers $\{1, 2, ..., M\}$, applying the write currents in a sequential order of $I(i_1)$, $I(i_2)$, ..., $I(i_M)$ to a magnetic write head moving in the X direction, resulting in generating the magnetization states $S(i_1)$, $S(i_2)$, ..., $S(i_M)$ for the island groups of $G(i_1)$, $G(i_2)$, ..., $G(i_M)$, respectively, wherein the write current $I(i_m)$ corresponding to island group $G(i_m)$ does not change the magnetization state of island group $G(i_n)$ (n<m) for m=2, 3, ..., M), and wherein for each island group G(m) consisting of said island pair, said generating comprises said magnetic write head writing the magnetization state [S1; S2](m) by simultaneously writing the magnetic states S1 and S2.

The present invention provides a method for reading magnetization states from a multi-level patterned magnetic medium comprising a plurality of pillars distributed in an X direction and a Y direction which are orthogonal to each other and define an X-Y plane, consecutive pillars of the plurality of pillars separated by non-magnetic material, each pillar comprising N magnetic islands distributed along a Z direction orthogonal to the X-Y plane, said N magnetic islands denoted as L(1), L(2), ..., L(N), said N at least 3. said method comprising:

reading, by a magnetic read head moving in the X direction, a readback waveform (W) specific to a magnetization state $[S_1; S_2; ... ; S_N]$ comprising magnetic states $S_1, S_2, ..., S_N$ in islands L(1), L(2), ..., L(N), respectively, in a first pillar of the plurality of pillars, said N magnetic islands in the first pillar comprising M island groups denoted as G(1), G(2), ..., G(M), said N magnetic islands consisting of P island pairs and Q single islands, wherein N=2P+Q, $M \geq 2$. $P \geq 1$. and $Q \geq 0$. wherein each island pair in the first pillar comprises two magnetic islands of the N magnetic islands of the first pillar, wherein each island pair in the first pillar comprises a magnetic state S1 in a first magnetic island of the two magnetic islands and a magnetic state S2 in a second magnetic island of the two magnetic islands of the pillar, wherein S1 and S2 are each selected from the group consisting of $S_1, S_2, ..., S_N$, wherein the first magnetic island and the second magnetic island have a magnetic easy axis respectively oriented at a first tilt angle ($\alpha_1$) and a second tilt angle ($\alpha_2$) with respect to the X direction, wherein $\alpha_1$ and $\alpha_2$ satisfy a condition selected from the group consisting of 1) $\alpha_1 \neq \alpha_2$, 2) either or both of $\alpha_1$ and $\alpha_2$ differing from 0, 90, 180. and 270 degrees, and 3) combinations thereof, and wherein the first magnetic island and the second magnetic island have a magnetic hard axis respectively oriented at a first tilt angle ($\alpha_1^*$) and a second tilt angle ($\alpha_2^*$) with respect to the X direction;

identifying the magnetization state $[S_1; S_2; ... ; S_N]$ by decoding the readback waveform W resulting from said reading; and displaying and/or recording the magnetization state $[S_1; S_2; ... ; S_N]$, wherein the magnetic state S1 and the magnetic state S2 is each a state A=[+1,+1]. a state B=[−1,−1]. a state C=[+1,−1]. or a state D=[−1,+1]. wherein the magnetic state S1 is respectively +1 or −1 if a magnetization of the first magnetic island is oriented at or opposite to the angle $\alpha_1$, and wherein the magnetic state S2 is respectively +1 or −1 if a magnetization of the second magnetic island is oriented at or opposite to the angle $\alpha_2$.

The present invention provides an apparatus comprising a computer program product, said computer program product comprising a computer readable storage medium having a computer readable program code stored therein, said computer readable program code containing instructions that when executed by a processor of a computer system implement a method for writing magnetization states in a multi-level patterned magnetic medium comprising a plurality of pillars distributed in an X direction and a Y direction which are orthogonal to each other and define an X-Y plane, consecutive pillars of the plurality of pillars separated by non-magnetic material, each pillar comprising N magnetic islands distributed along a Z direction orthogonal to the X-Y plane, said N magnetic islands denoted as L(1), L(2), ..., L(N), said N at least 3. said method comprising:

selecting M island groups denoted as G(1), G(2), ..., G(M) from the N magnetic islands in a first pillar of the plurality of pillars, said M island groups consisting of P island pairs and Q single islands, wherein 2≦M≦N−1. P≧1. and Q≧0;

selecting magnetization states S(1), S(2), ..., S(M) corresponding to the island groups G(1), G(2), ..., G(M), respectively, for each island group G(m) (m=1, 2, ..., or M) consisting of an island pair, the magnetization state S(m) is denoted as [S1; S2](m), wherein S1 and S2 are a first and second magnetic state in a first and second magnetic island, respectively, of the island pair, wherein $\alpha_1^*$ and $\alpha_2^*$ are a first tilt angle and a second tilt angle at which a hard axis of the first magnetic island and the second magnetic island are respectively oriented with respect to the X direction, and wherein either or both of $\alpha_1^*$ and $\alpha_2^*$ are in a range of 0 to −90 degrees;

for each island group G(m') (m'=1, 2, ..., or M) consisting of a single island, the magnetization state S(m') is +1 or −1 if the magnetization is oriented at or opposite to, respectively, a tilt angle ($\alpha$) at which an easy axis of the single island is oriented with respect to the X direction;

determining write currents I(1), I(2), ..., I(M) sufficient to write the magnetization states S(1), S(2), ..., S(M), respectively;

for a set of indexes $\{i_1, i_2, ..., i_M\}$ such that each index maps to a unique integer in the set of integers $\{1, 2, ..., M\}$, applying the write currents in a sequential order of $I(i_1)$, $I(i_2)$, ..., $I(i_M)$ to a magnetic write head moving in the X direction, resulting in generating the magnetization states $S(i_1)$, $S(i_2)$, ..., $S(i_M)$ for the island groups of $G(i_1)$, $G(i_2)$, ..., $G(i_M)$, respectively, wherein the write current $I(i_m)$ corresponding to island group $G(i_m)$ does not change the magnetization state of island group $G(i_n)$ (n<m) for m=2, 3, ..., M), and wherein for each island group G(m) consisting of said island pair, said generating comprises said magnetic write head writing the magnetization state[S1; S2](m) by simultaneously writing the magnetic states S1 and S2.

The present invention provides an apparatus comprising a computer program product, said computer program product comprising a computer readable storage medium having a computer readable program code stored therein, said computer readable program code containing instructions that when executed by a processor of a computer system implement a method for reading magnetization states from a multi-level patterned magnetic medium comprising a plurality of pillars distributed in an X direction and a Y direction which are orthogonal to each other and define an X-Y plane, consecutive pillars of the plurality of pillars separated by non-magnetic material, each pillar comprising N magnetic islands distributed along a Z direction orthogonal to the X-Y plane, said N magnetic islands denoted as L(1), L(2), ..., L(N), said N at least 3. said method comprising:

reading, by a magnetic read head moving in the X direction, a readback waveform (W) specific to a magnetization state $[S_1; S_2; ...; S_N]$ comprising magnetic states $S_1$, $S_2$, ..., $S_N$ in islands L(1), L(2), ..., L(N), respectively, in a first pillar of the plurality of pillars, said N magnetic islands in the first pillar comprising M island groups denoted as G(1), G(2), ..., G(M), said N magnetic islands consisting of P island pairs and Q single islands, wherein N=2P+Q, M≧2. P≧1. and Q≧0. wherein each island pair in the first pillar comprises two magnetic islands of the N magnetic islands of the first pillar, wherein each island pair in the first pillar comprises a magnetic state S1 in a first magnetic island of the two magnetic islands and a magnetic state S2 in a second magnetic island of the two magnetic islands of the pillar, wherein S1 and S2 are each selected from the group consisting of $S_1, S_2, ..., S_N$, wherein the first magnetic island and the second magnetic island have a magnetic easy axis respectively oriented at a first tilt angle ($\alpha_1$) and a second tilt angle ($\alpha_2$) with respect to the X direction, wherein $\alpha_1$ and $\alpha_2$ satisfy a condition selected from the group consisting of 1) $\alpha_1 \neq \alpha_2$, 2) either or both of $\alpha_1$ and $\alpha_2$ differing from 0, 90, 180. and 270 degrees, and 3) combinations thereof, and wherein the first magnetic island and the second magnetic island have a magnetic hard axis respectively oriented at a first tilt angle ($\alpha_1^*$) and a second tilt angle ($\alpha_2^*$) with respect to the X direction;

identifying the magnetization state $[S_1; S_2; ...; S_N]$ by decoding the readback waveform W resulting from said reading; and displaying and/or recording the magnetization state $[S_1; S_2; ...; S_N]$, wherein the magnetic state S1 and the magnetic state S2 is each a state A=[+1,+1]. a state B=[−1,−1]. a state C=[+1,−1]. or a state D=[−1,+1]. wherein the magnetic state S1 is respectively +1 or −1 if a magnetization of the first magnetic island is oriented at or opposite to the angle $\alpha_1$, and wherein the magnetic state S2 is respectively +1 or −1 if a magnetization of the second magnetic island is oriented at or opposite to the angle $\alpha_2$.

The present invention provides magnetic recording with a patterned recording medium that increases recording density for the patterned recording medium and improves the efficiency of writing bits of data on the patterned recording medium.

BRIEF DESCRIPTION OF THE DRAWINGS

FIG. 6B depicts a magnetic write head above a magnetic medium, in accordance with embodiments of the present invention.

DETAILED DESCRIPTION OF THE INVENTION

The present invention provides a multi-level patterned magnetic recording medium comprising N levels (N≧2), a method for writing independent bits simultaneously at two levels of the medium thus reducing the writing steps for the two levels by a factor of 2. The present invention also provides a method for reading the information states stored in simultaneously written two levels of a multi-level patterned magnetic recording medium. The method and system of the present invention is with respect to a two-level magnetic medium (i.e., N=2) or to a selected two levels of a magnetic medium comprising more than 2 levels (i.e., N>2).

Figure 1:
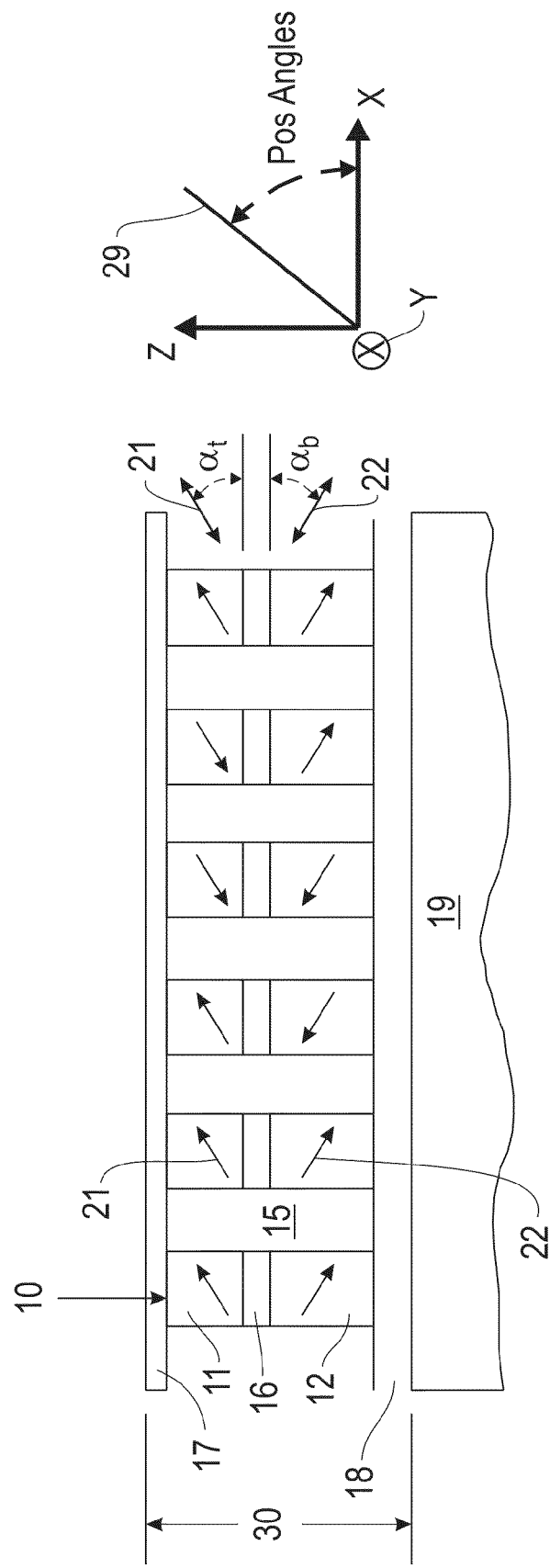
FIG. 1 is a schematic description of a patterned multi-level magnetic medium with 2 levels, in accordance with embodiments of the present invention.

FIG. 1 is a schematic description of a multi-level patterned magnetic medium 30 with 2 levels, in accordance with embodiments of the present invention. The magnetic medium 30 comprises a recording layer made of individual magnetic pillars 10 that are spaced apart in the X direction and in the Y direction by a non-magnetic material 15 such as, inter alia, $SiO_2$, $Al_2O_3$, etc. The X direction and the Y direction define an X-Y plane. In one embodiment, the magnetic islands in the pillars 10 are separated from each other in the Z direction which is orthogonal to the X-Y plane by a spacer layer 16. The X, Y, and Z directions are mutually orthogonal to one another and form a (X, Y, Z) right-handed rectangular coordinate system as shown in FIG. 1. In one embodiment, the spacer layer 16 does not exist and consecutive magnetic islands in each magnetic pillar 10 are not physically separated from each other but nonetheless behave independently. The magnetic medium 30 may include an overcoat 17 and an under-layer 18 between the recording layer and a substrate 19.

In one embodiment, the substrate 19 may comprise a material used in disk drives (e.g., conventional disk drives), including a material such as, inter alia, glass and AlMg. In one embodiment, the substrate 19 may comprise a semiconductor material such as, inter alia, silicon. In one embodiment, the substrate 19 may be a plastic substrate (e.g., PET, PEN, Aramid) used for tape media.

In one embodiment, the under-layer 18 may include one or more materials that can be used as seeds and for promoting orientation of the magnetic layers and may include, inter alia, Ti, Cr, C, NiAl, CoCr, CoO, etc.

In one embodiment, the overcoat 17 may be, inter alia, a diamond-like carbon overcoat, a lubricant layer, etc.

Each magnetic pillar 10 comprises a top magnetic island 11 and a bottom magnetic island 12 which in one embodiment are isolated from each other in the Z direction by the spacer layer 16. In one embodiment, the spacer layer 16 comprises a non-magnetic spacer material such as, inter alia, Cu, Ag, Au, Ru, CoO, SiO, etc. In one embodiment, the spacer layer 16 comprises a ferromagnetic material that does not disturb the magnetic behavior of each top island 11 and bottom island 12 of the magnetic pillars 10. As indicated supra, in one embodiment, the spacer layer 16 does not exist and consecutive magnetic islands in each magnetic pillar 10 are not physically separated from each other but nonetheless behave independently.

Each top island 11 and bottom island 12 is a single-domain particle or an assembly of particles that behave as a single magnetic volume. The magnetic material of each top island 11 and each bottom island 12 may comprise, inter alia, thin film or particulate, made of Fe, Co, Ni, or made of an alloy containing at least one element among Fe, Co, Ni, Mn, Cr. Typical media materials are based on: Co alloys (e.g., CoPtCr, $Co_3Pt$); magnetic alloys with L10 phase (e.g., FePd, FePt, CoPt, MnAl), rare earth alloys (e.g., FeNdB, $SmCo_5$); oxides (e.g., $CrO_2$, $Fe_3O_4$, $(CoFe)_3O_4$, BaFeO).

FIG. 1 depicts an (X, Y, Z) rectangular coordinate system. In the forward direction, the magnetic head (see FIG. 6) is moving in the positive X direction. In the reverse direction, the magnetic head is moving in the negative X direction. Any line or vector, as represented by the line 29 in FIG. 1, makes a positive angle with the X axis as shown. Unless otherwise stated, all numerical values of angles appearing herein, including in the claims, are in units of degrees.

Figure 6A:
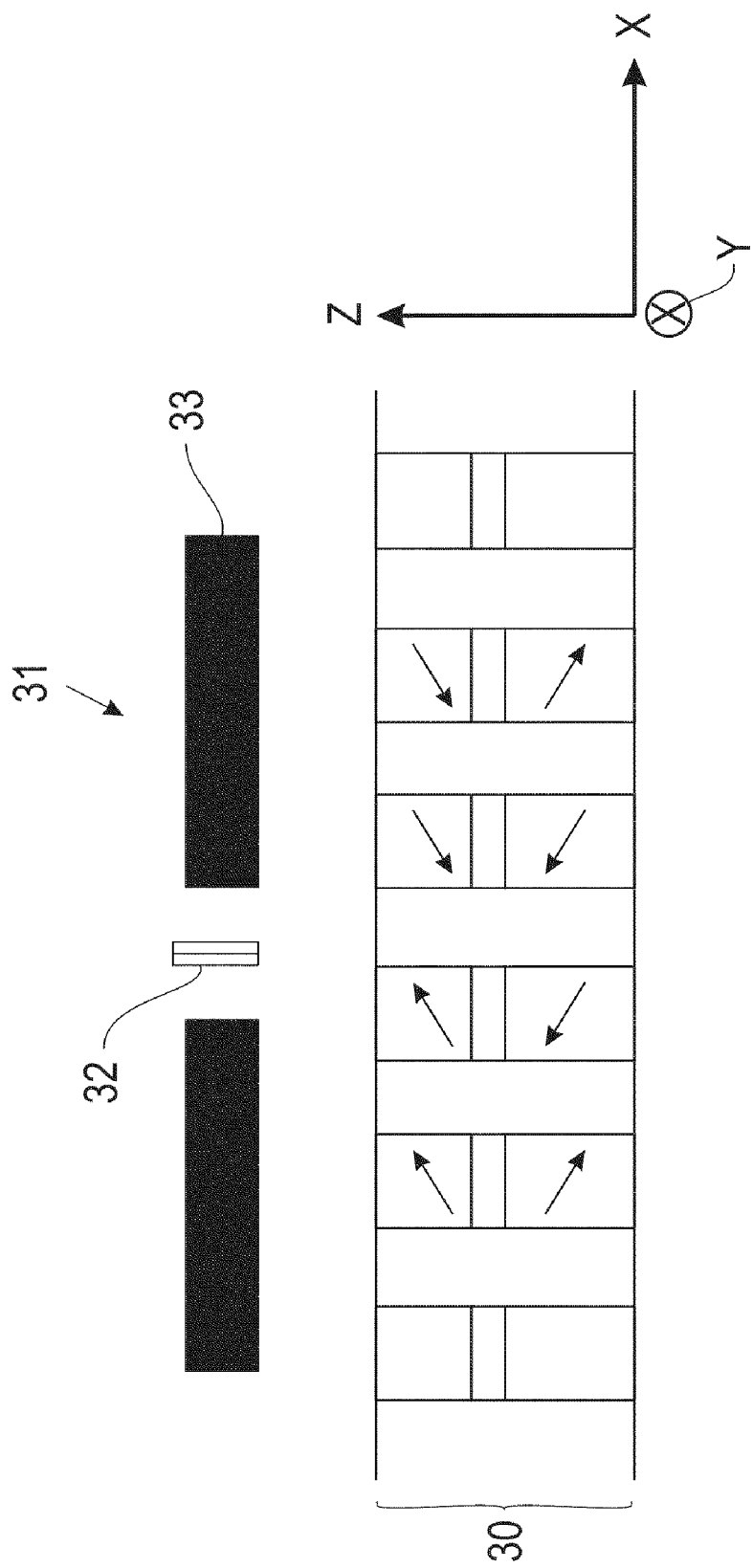
FIG. 6A depicts a magnetic read head above the magnetic medium of FIG. 1, in accordance with embodiments of the present invention.

FIG. 6A depicts a magnetic read head 31 above the magnetic medium 30 of FIG. 1, such that the read head 31 is configured to move in the +X or −X direction, in accordance with embodiments of the present invention. The read head 31, which comprises a magnetoresistive read element 32 and a magnetic shield 33 surrounding the magnetoresistive read element 32, is configured to read data from the magnetic medium 30.

FIG. 6B depicts a magnetic write head 35 above the magnetic medium 30 of FIG. 1, in accordance with embodiments of the present invention. The write head 35 comprises a coil 7 wound around a soft core 6 and configured to carry an electric current in the coil wire 7 for generating a magnetic field that extends into the medium 30 and has a field strength exceeding the coercivity (i.e., switching field) of the medium 30 so as to write data to the magnetic medium 30.

Figure 6C:
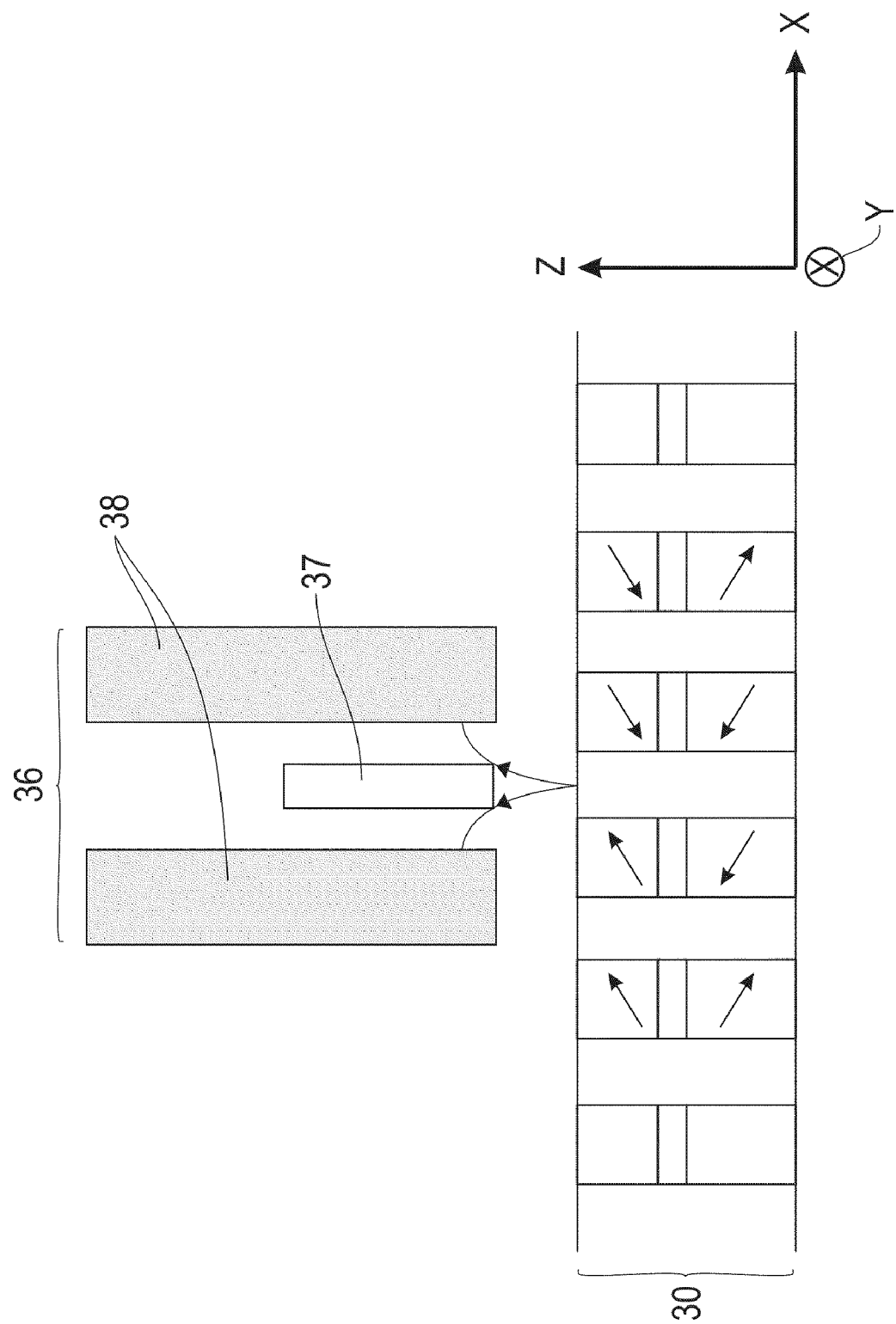
FIG. 6C depicts a magnetic read head above a magnetic medium, in accordance with embodiments of the present invention.

FIG. 6C depicts a magnetic read head 36 above the magnetic medium 30 of FIG. 1, in accordance with embodiments of the present invention. The read head 36, which comprises a magnetoresistive read element 37 and a magnetic shield 38 surrounding the magnetoresistive read element 37, is configured to read data from the magnetic medium 30.

Figure 6D:
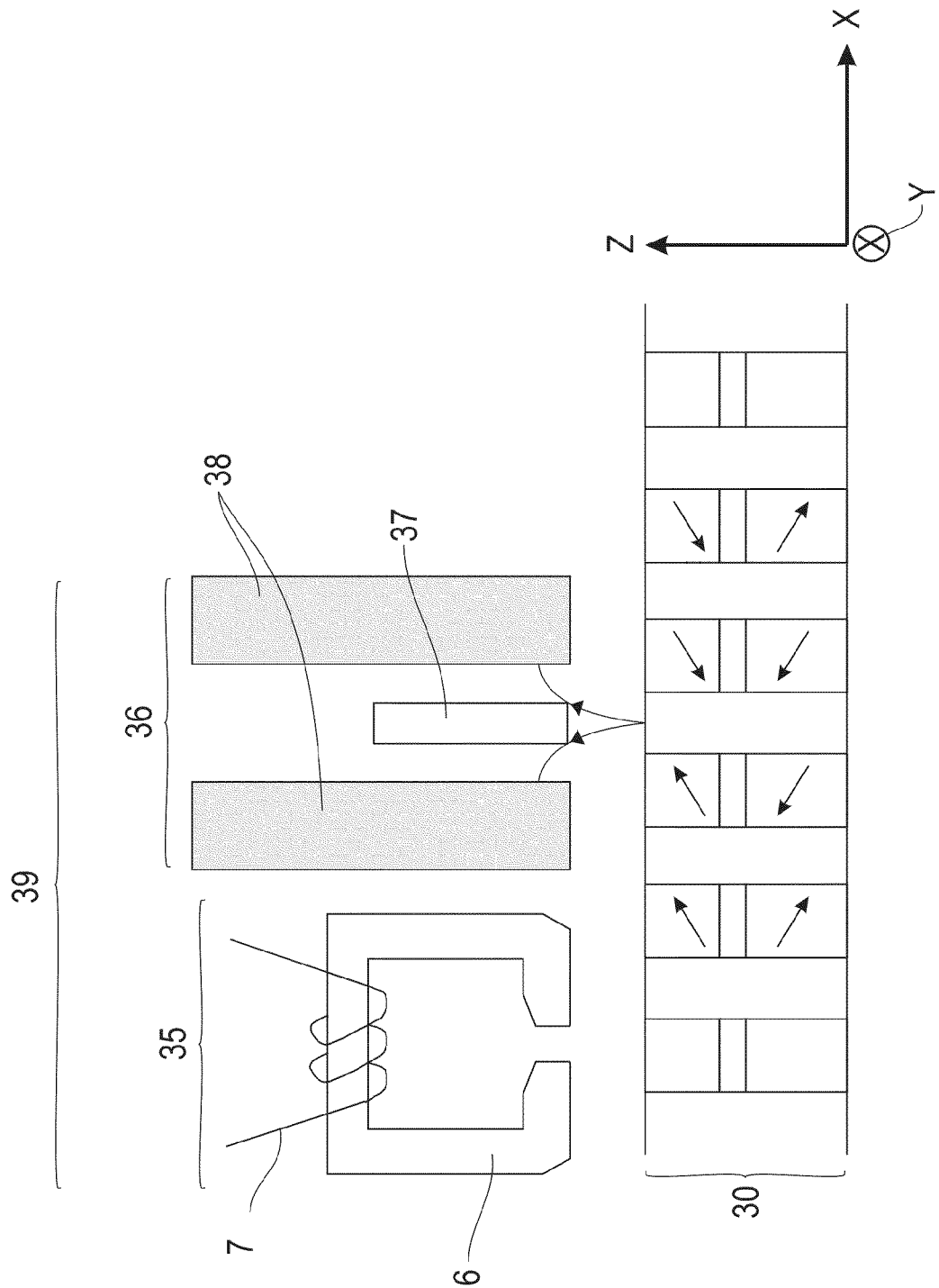
FIG. 6D depicts a magnetic read/write head above a magnetic medium, in accordance with embodiments of the present invention.

FIG. 6D depicts a magnetic read/write head 39 above the magnetic medium 30, in accordance with embodiments of the present invention. The magnetic read/write head 39, which comprises the write head 35 of FIG. 6B and the read head 36 of FIG. 6C, is configured to both write data to and read data from the magnetic medium 30.

In FIGS. 6A-6D, the read heads 31 and 36 and the write head 35 each extend along the Y direction over a distance that allows the read heads and the write head to effectively read and write one pillar at a time. In one embodiment, the spatial extent of the read and/or write head along the Y direction is about equal to the period of the array of pillars in the Y direction.

For the description herein, a magnetic write head is a magnetic head that is configured to write to, but not to read from, a magnetic medium (e.g., the write head 35 of FIG. 6B or of FIG. 6D). Similarly, a magnetic read head is a magnetic head that is configured to read from, but not write to, a magnetic medium (e.g., the read head 31 of FIG. 6A or the read head 36 of FIG. 6C or FIG. 6D).

In FIG. 1, each top island 11 comprises magnetic material having a magnetic easy axis tilted at an angle $\alpha_t$ ($-90<\alpha_t<90$) with respect to the X axis, a magnetic hard axis tilted at an angle $\alpha_t^*$ ($-180<\alpha_t^*<0$) with respect to the X axis, a switching field $H_{sw,t}$, a remanent magnetization $M_{r,t}$, and a volume $V_t$. The magnetization 21 represents a magnetic state in the top island 11 that is oriented along the easy axis, either at the angle $\alpha_t$ with respect to the X axis or at the angle $180+\alpha_t$ with respect to the X axis.

Each bottom island 12 comprises magnetic material having a magnetic easy axis that is tilted at an angle $\alpha_b$ ($-90<\alpha_b<90$) with respect to the X axis, a magnetic hard axis tilted at an angle $\alpha_b^*$ ($-180<\alpha_b^*<0$) with respect to the X axis, a switching field $H_{sw,b}$, a remanent magnetization $M_{r,b}$, and a volume $V_b$. The magnetization 22 represents a magnetic state in the bottom island 12 that is oriented along the easy axis, either at the angle $\alpha_b$ with respect to the X axis or at the angle $180+\alpha_b$ with respect to the X axis.

The hard axis tilt angle $\alpha a_t^*$ can be between $-80$ and $-10$ degrees. Then, if recording in both +X and -X directions is required, $\alpha_b^*$ should be between $-170$ and $-100$ degrees. Otherwise, $\alpha_b^*$ can be any angle given certain conditions that vary with $\alpha_t^*$, $H_{sw,b}/H_{sw,t}$ ratio, the thicknesses in the pillar 10 in the Z direction, the head-media spacing, and the write head characteristics.

The hard axis tilt angle $\alpha_b^*$ can be between $-80$ and $-10$ degrees. Then, if recording in both +X and -X directions is required $\alpha_t^*$ should be between $-170$ and $-100$ degrees. Otherwise, $\alpha_t^*$ can be any angle given certain conditions that vary with $\alpha_b^*$, $H_{sw,b}/H_{sw,t}$ ratio, the thicknesses in the pillar 10, the head-media spacing, and the write head characteristics.

The angles $\alpha_t^*$, $\alpha_b^*$, $\alpha_t$, $\alpha_b$, of the top islands 11 and the bottom islands 12 in each pillar 10, the dimensions and volumes $V_t$, $V_b$ of the top islands 11 and the bottom islands 12, the thickness of the spacer layer 16, the magnetic materials of the top islands 11 and the bottom islands 12, and the switching fields $H_{sw,t}$, $H_{sw,b}$ of the top islands 11 and the bottom islands 12, respectively, can be adjusted for optimum writing, optimum data retention, and such that all four possible magnetization states of a pillar 10 are differentiated in the read-back signal.

Each pillar 10 can be made of a large assembly of nanoparticles with a similar easy axis within each island and independent easy axis for each island in the pillar. When all nanoparticles are aligned in the same positive direction, and when the pillar has no spacer layer, the depth of the transition between the top and bottom bits can be defined by the write current applied to the magnetic head 35 of FIG. 6B or FIG. 6D.

There are various methods to fabricate patterned media such as, inter alia, deposition on a patterned substrate, patterning by etching continuous layers, ion irradiation through a mask, or self-assembly.

The present invention enables writing the two-level patterned magnetic medium 30 at the two depths simultaneously.

With 2 levels being written to, there are $2^2=4$ possible magnetization states A, B, C, D in each pillar 10. Each magnetization state is defined by the orientation of the magnetization $M_{r,t}$ and $M_{r,b}$ in the top and bottom islands, respectively. With +1 corresponding to the magnetization along $\alpha_t$ or $\alpha_b$, -1 corresponding to the magnetization along $180+\alpha_t$ or $180+\alpha_b$, the 4 magnetization states are A=[+1,+1]. B=[-1;-1]. C=[+1,-1]. D=[-1,+1]. Thus, the magnetization state [S1; S2] represents A, B, C, or D with the first magnetic state $S1=\pm 1$ and the second magnetic state $S2=\pm 1$ defining the magnetic orientation of the top islands 11 and the bottom islands 12, respectively.

The magnetization of the top islands 11 and the bottom islands 12 of one pillar 10 of the medium is set simultaneously by using an adequate write current applied to the magnetic write head 35 of FIG. 6B or FIG. 6D. For each of the 4 recording states (A, B, C, D) in the magnetic pillar 10, there is a different write current: I1, I2, -I1 and -I2. These write currents are defined by the write head characteristics, the head-media spacing, and the dimensions and magnetic parameters of the medium (hard axis angles, anisotropy field values, angular dependence of the switching fields, etc . . . ). The writing process is described in detail infra.

Writing 4-bits data in the patterned pillars uses any write head such as a conventional write head (e.g., a conventional ring head). Such a write head generates magnetic fields in the magnetic medium. The field amplitude increases with increasing write current. The field amplitude decreases with increasing distance from the write gap center to a position in the medium. The field angle Φ (with respect to the X axis) also varies depending on the relative position of the head to the medium as illustrated in FIG. 2.

Figure 2:
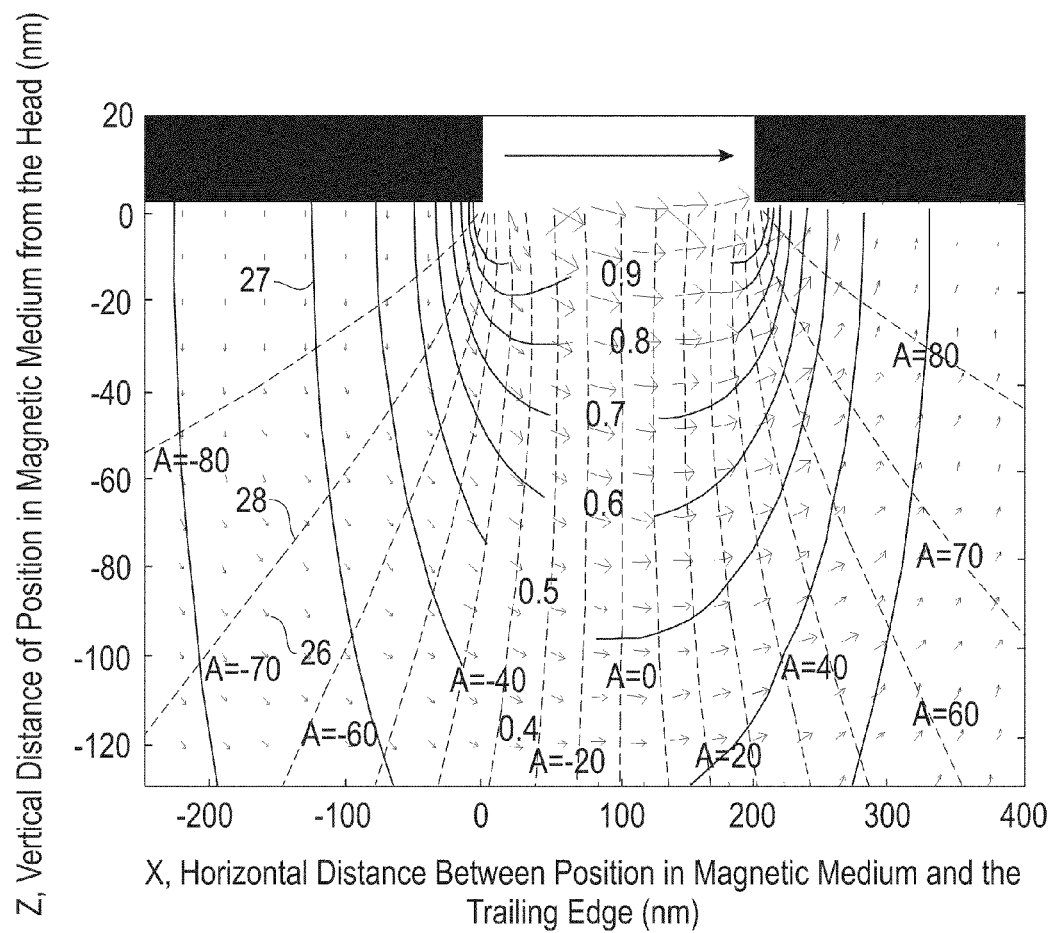
FIG. 2 is a representation of magnetic fields generated by a write head, in accordance with embodiments of the present invention.

FIG. 2 is a representation of magnetic fields generated by a write head, in accordance with embodiments of the present invention. Given a position (X, Z) in the magnetic medium, X denotes the distance (in the X direction) between the position (X, Z) in the magnetic medium and a trailing edge of the write head, and Z denotes the distance (in the Z direction) between the position (X, Z) in the magnetic medium and the write head. Arrows 26 represents magnetic field direction and field amplitude at given points. Lines 27 are contour plots of the field normalized to the deep gap field Hg (levels going from 0.2 to 1). Lines 28 are contour plots of the field angle Φ (levels of 0 degree to +/-80 degrees). Note that Hg is proportional to the write current I: Hg.g=N.I.$\epsilon$, with g the write gap, N the number of turns, and E the efficiency of the head. This is a calculation using Karlqvist approximation with a write gap g of 200 nm.

A magnetic island of the patterned medium switches its magnetization when the field to which it is submitted is larger than its switching field ($H_{sw}$). The value of the switching field depends on the material properties of the magnetic island and of the relative angle between the applied field and the particle easy or hard axis direction. The material properties of the magnetic island are determined by the magnetic medium and defines the anisotropy field $H_a$.

Figure 3:
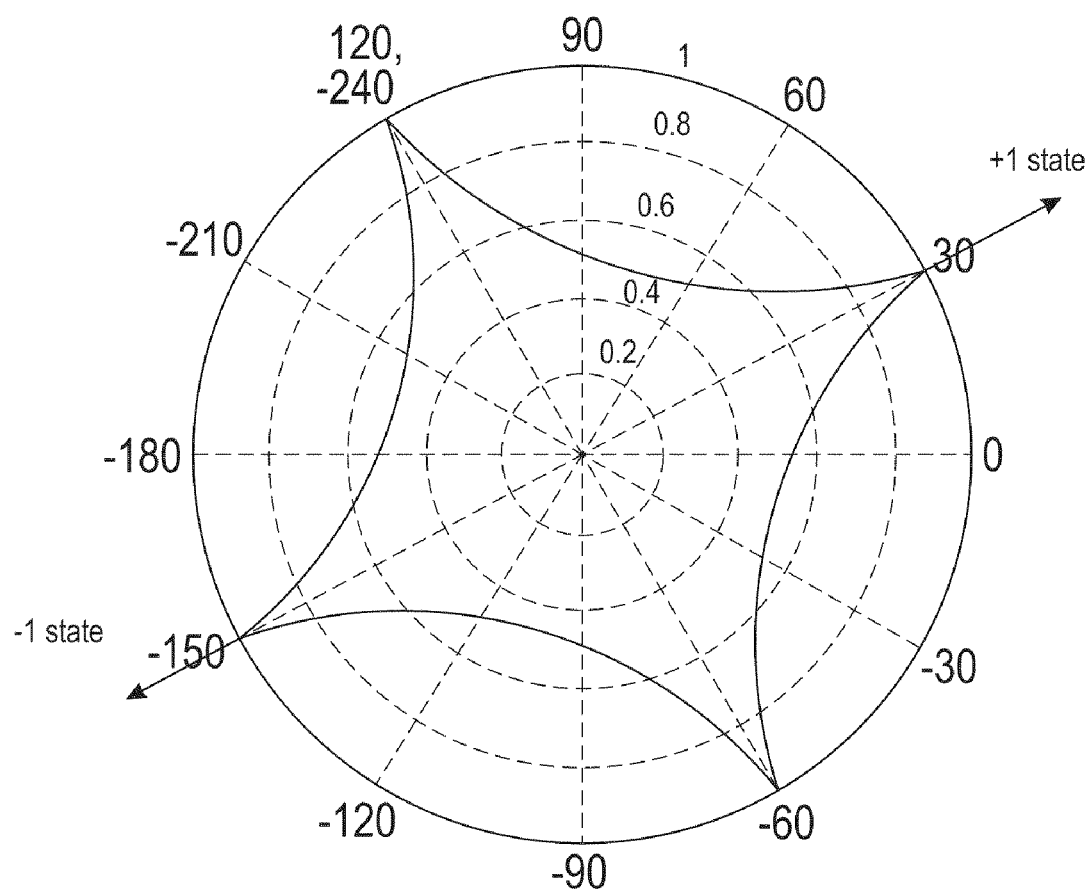
FIG. 3 depicts a Stoner-Wolfarth astroid representing the amplitude of switching field as a function of field direction related to easy axis direction along +30°, in accordance with embodiments of the present invention.

If the field (H) generated by the write head is larger than $H_{sw}(\Phi)$ with $\alpha_0^* < \phi < \alpha_0^* + 180$ then the resulting state is +1 (M along $\alpha_0$), wherein $\Phi$ is the angle of magnetic field in the magnetic medium with respect to the X direction, wherein $\alpha_0$ denotes the tilt angle, $\alpha_t$ or $\alpha_b$, of the magnetic easy axis in the top island or the bottom island, respectively, and wherein $\alpha_0^*$ denotes the tilt angle, $\alpha_t^*$ or $\alpha_b^*$, of the magnetic hard axis in the top island or the bottom island, respectively. In one embodiment, the magnetic material is characterized by the hard axis angle $\alpha_0^*$ being equal to $-90+\alpha_0$. If the field (H) is larger than $H_{sw}(\phi)$ with $\alpha_0^*-180 < \phi < \alpha_0^*$, then the resulting state is $-1$ (M along $180+\alpha_0$). FIG. 3 (discussed infra) illustrates this with $\alpha_0=30°$ and Stoner-Wolhfarth model $H_{sw}(\phi)=H_a/[\sin^{(2/3)}(\phi-\alpha_0)+\cos^{(2/3)}(\phi-\alpha_0)]^{(3/2)}$ and $\alpha_0=\alpha_0^*+90$ used as an example of the dependence of the switching field vs. easy axis angle.

In one embodiment, the magnetic material is characterized by $|\alpha_0^*-\alpha_0|$ not being equal to 90 degrees.

FIG. 3 depicts a Stoner-Wolfarth astroid representing the amplitude of switching field as a function of field direction related to easy axis direction along +30°, in accordance with embodiments of the present invention. The hard axis angle is $-60°$ for that model. For applied fields between [$-60,120$] the resulting state after all fields are switched off is +1 (along 30° direction). For fields between [$-240,-60$] the resulting state after all fields are switched off is $-1$ (along $-150°$ direction).

As described supra, the fields created by a write head at the trailing edge have angles $\phi$ that vary from 0 to almost $-90$ degrees (with positive current) depending on the X position (X varying from 0 to -infinity). Moreover, the amplitude of the field decreases if the Z distance to the head increases and if the X position decreases towards -infinity, but is tuned by the write current.

From the discussion supra of FIGS. 2 and 3, the following facts (a), (b), (c), (d), (e) and (f) are deduced.

(a) For $\alpha_t^*$ between $-10$ and $-80$ degrees, and $\alpha_b^*$ between $-180$ and $-90$ degrees:

(a1) a positive write current (I1a) may be determined such that in the top island 11, $\alpha_t^* < \phi_t < 0$ and $H_t \geq H_{sw,t}(\phi_t)$ and simultaneously in the bottom island 12, $\alpha_b^* < \phi_b < 0$ and $H_b \geq H_{sw,b}(\phi_b)$, wherein $H_t$ and $H_b$ respectively denote the magnetic field strength in the top island 11 and the bottom island 12, and wherein $\phi_t$ and $\phi_b$ respectively denote the magnetic field direction relative to the X axis in the top island 11 and the bottom island 12. Then, after removal of all fields, the magnetization in top island 11 and bottom island 12 snaps back on the easy axis along $+\alpha_t$ and $+\alpha_b$ (state A).

(a2) a positive write current (I2a>I1a) may be determined such that: in the top island 11, $-90 < \phi_t < \alpha_t^*$ and $H_t \geq H_{sw,t}(\phi_t)$; and in the bottom island 12, $\alpha_b^* < \phi_b < 0$ and $H_b \geq H_{sw,b}(\phi_b)$. Then, after removal of all fields, the magnetization in both islands 11 and 12 snaps back on the easy axis along $180+\alpha_t$ for the top island 11 and $\alpha_b$ for the bottom island 12 (state D).

(a3) using currents of opposite polarities ($-$I1a and $-$I2a) the medium is written in the two other possible medium magnetization states (B and C respectively).

(b) For $\alpha_b^*$ between $-80$ and $-10$ degrees, and $\alpha_t^*$ between $-180$ and $-90$ degrees:

(b1) a positive write current (I1b) may be determined such that in the top island 11, $\alpha_t^* < \phi_t < 0$ and $H_t \geq H_{sw,t}(\phi_t)$ and simultaneously in the bottom island 12, $\alpha_b^* < \phi_b < 0$ and $H_b \geq H_{sw,b}(\phi_b)$. Then, after removal of all fields, the magnetization in both islands 11 and 12 snaps back on the easy axis along $+\alpha_t$ and $+\alpha_b$ (state A).

(b2) a positive write current (I2b>I1b) may be determined such that in the top island 11, $\alpha_t^* < \phi_t < 0$ and $H_t \geq H_t(\phi_t)$ and in the bottom island 12, $-90 < \phi_b < \alpha_b^*$ and $H_b \geq H_{sw,b}(\phi_b)$. Then, after removal of all fields, the magnetization in both islands 11 and 12 snaps back on the easy axis along $\alpha_t$ for the top island 11 and $180+\alpha_b$ for the bottom island 12 (state C).

(b3) using currents of opposite polarities ($-$I1b and $-$I2b) the medium is written in the two other possible medium magnetization states (states B and D respectively).

c) For $\alpha_t^*$ between $-80$ and $-10$ degrees, and $\alpha_b^*$ between $-90$ and 0 degrees that satisfies $\alpha_b^* \cdot \phi_b < 0$ with $H_b \geq H_{sw,b}(\phi_b)$ at I2c everywhere in the bottom island 12:

(c1) a positive write current (I1c) may be determined such that in the top island 11, $\alpha_t^* < \phi_t < 0$ and $H_t \geq H_{sw,t}(\phi_t)$ and simultaneously in the bottom island 12, $\alpha_b^* < \phi_b < 0$ and $H_b \geq H_{sw,b}(\phi_b)$. Then, after removal of all fields, the magnetization in both islands 11 and 12 back on the easy axis along $+\alpha_t$ and $+\alpha_b$ (state A).

(c2) a positive write current (I2c>I1c) may be determined such that in the top island 11, $-90 < \phi_t < \alpha_t^*$ and $H_t \geq H_{sw,t}(\phi_t)$ and in the bottom island 12, $\alpha_b^* < \phi_b < 0$ and $H_b \geq H_{sw,b}(\phi_b)$. Then, after removal of all fields, the magnetization in both islands 11 and 12 snaps back on the easy axis along $180+\alpha_t$ for the top island 11 and $\alpha_b$ for the bottom island 12 (state D).

(c3) using currents of opposite polarities ($-$I1e and $-$I2c) the medium is written in the two other possible medium magnetization states (B and C respectively).

d) For $\alpha_b^*$ between $-80$ and $-10$ degrees, and $E_t^*$ between $-90$ and 0 degrees that satisfies $\alpha_t^* < \phi_t < 0$ and $H_t \geq H_{sw,t}$ at I2d everywhere in the top island 11:

(d1) a positive write current (I1d) may be determined such that in the top island 11, $\alpha_t^* < \phi_t < 0$ and $H_t \geq H_{sw,t}(\phi_t)$ and simultaneously in the bottom island 12, $\alpha_b^* < \phi_b < 0$ and $H_b \geq H_{sw,b}(\phi_b)$. Then, after removal of all fields, the magnetization in both islands 11 and 12 snaps back on the easy axis along $+\alpha_t$ and $+\alpha_b$ (state A).

(d2) a positive write current (I2d>I1d) may be determined such that in the top island 11, $\alpha_t^* < \phi_t < 0$ and $H_t \geq H_{sw,t}(\phi_t)$ and in the bottom island 12, $-90 < \phi_b < \alpha_b^*$ and $H_b \geq H_{sw,b}(\phi_b)$. Then, after removal of all fields, the magnetization in both islands 11 and 12 snaps back on the easy axis along $\alpha_t$ for the top island 11 and $180+\alpha_b$ for the bottom island 12 (state C).

(d3) using currents of opposite polarities ($-$I1d and $-$I2d) the medium is written in the two other possible medium magnetization states (states B and D respectively).

e) For $\alpha_t^*$ between $-80$ and $-10$ degrees, and $\alpha_b^*$ between $-90$ and 0 degrees that satisfies $\alpha_b^* < \phi_b < 0$ with $H_b \geq H_{sw,b}(\phi_b)$ at I2e everywhere in the bottom island 12:

(e1) a positive write current (I1e) may be determined such that in the top island 11, $-90 < \phi_t < \alpha_t^*$ and $H_t \geq H_{sw,t}(\phi_t)$ and simultaneously in the bottom island 12, $-90 < \phi_b < \alpha_b^*$ and $H_b \geq H_{sw,b}(\phi_b)$. Then, after removal of all fields, the magnetization in both islands 11 and 12 back on the easy axis along $180+\alpha_t$ and $180+\alpha_b$ (state B).

(e2) a positive write current (I2e<I1e) may be determined such that in the top island 11, $-90 < \phi_t < \alpha_t^*$ and $H_t \geq H_{sw,t}(\phi_t)$ and in the bottom island 12, $\alpha_b^* < \phi_b < 0$ and $H_b \geq H_{sw,b}(\phi_b)$. Then, after removal of all fields, the magnetization in both islands 11 and 12 snaps back on the easy axis along $180+\alpha_t$ for the top island 11 and $\alpha_b$ for the bottom island 12 (state D).

(e3) using currents of opposite polarities ($-$I1e and $-$I2e) the medium is written in the two other possible medium magnetization states (A and C respectively).

f) For $\alpha_b^*$ between −80 and −10 degrees, and $\alpha_t^*$ between −90 and 0 degrees that satisfies $\alpha_t^* < \phi_t < 0$ and $H_t \geq H_{sw,t}(\phi_t)$ at I2f everywhere in the top island 11:

(f1) a positive write current (I1f) may be determined such that in the top island 11, $-90 < \phi_t < \alpha_t^*$ and $H_t \geq H_{sw,t}(\phi_t)$ and simultaneously in the bottom island 12, $-90 < \phi_b < \alpha_b^*$ and $H_b \geq H_{sw,b}(\phi_b)$. Then, after removal of all fields, the magnetization in both islands 11 and 12 back on the easy axis along $180 + \alpha_t$ and $180 + \alpha_b$ (state B).

(f2) a positive write current (I2f<I1f) may be determined such that in the top island 11, $\alpha_t^* < \phi_t < 0$ and $H_t \geq H_{sw,t}(\phi_t)$ and in the bottom island 12, $-90 < \phi_b < \alpha_b^*$ and $H_b \geq H_{sw,b}(\phi_b)$. Then, after removal of all fields, the magnetization in both islands 11 and 12 snaps back on the easy axis along $\alpha_t$ for the top island 11 and $180 + \alpha_b$ for the bottom island 12 (state C).

(f3) using currents of opposite polarities (−I1f and −I2f) the medium is written in the two other possible medium magnetization states (states A and D respectively).

In one embodiment, $\alpha_1 \neq \alpha_2$. In one embodiment, $|\alpha_1| \neq |\alpha_2|$.

Figure 4A:
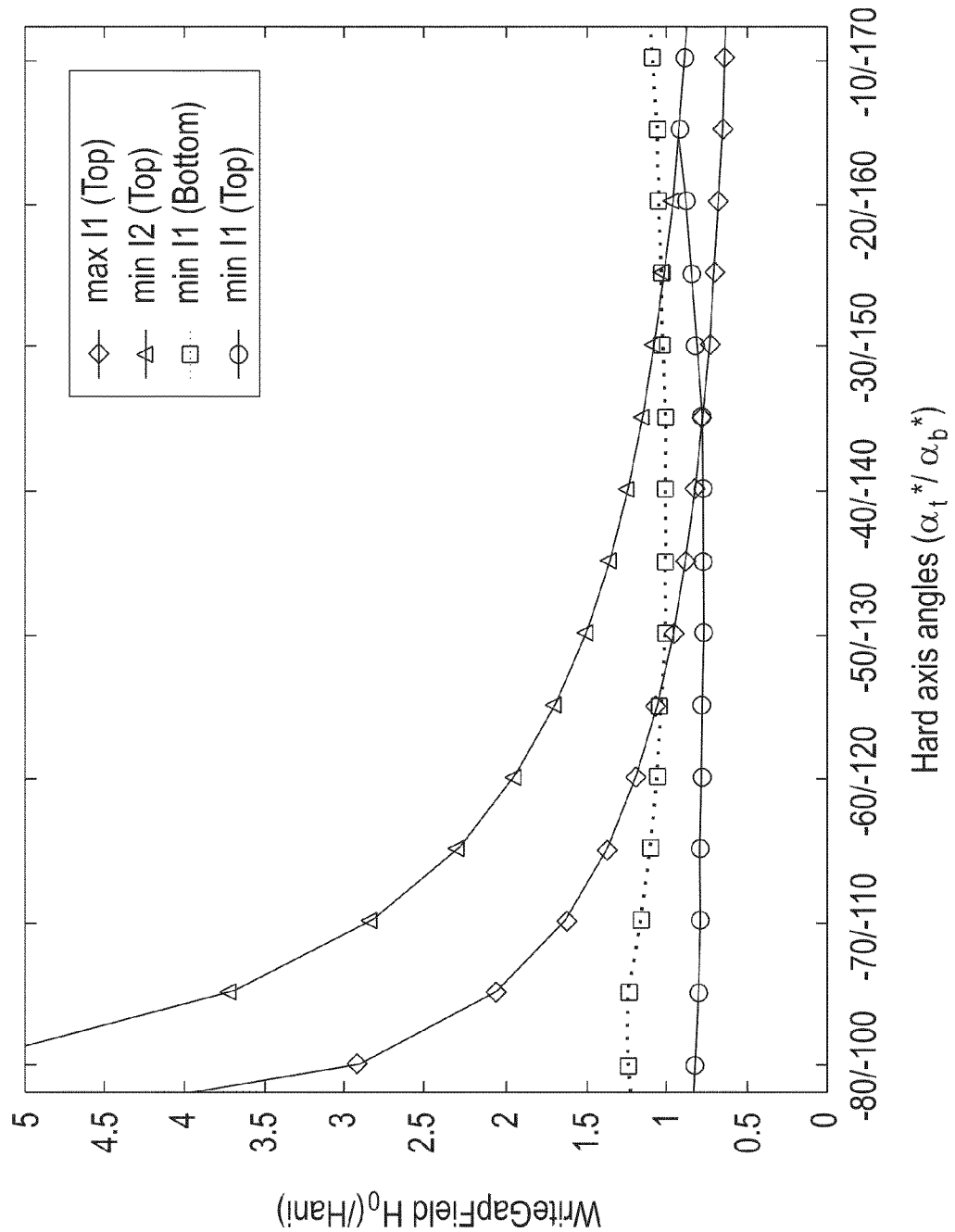
FIGS. 4A, 4B, 4C, 4D, 4E, and 4F show calculations of the write current for multi-level patterned magnetic media for various ranges of hard axis angle in the top and bottom islands, in accordance with embodiments of the present invention.
Figure 4B:
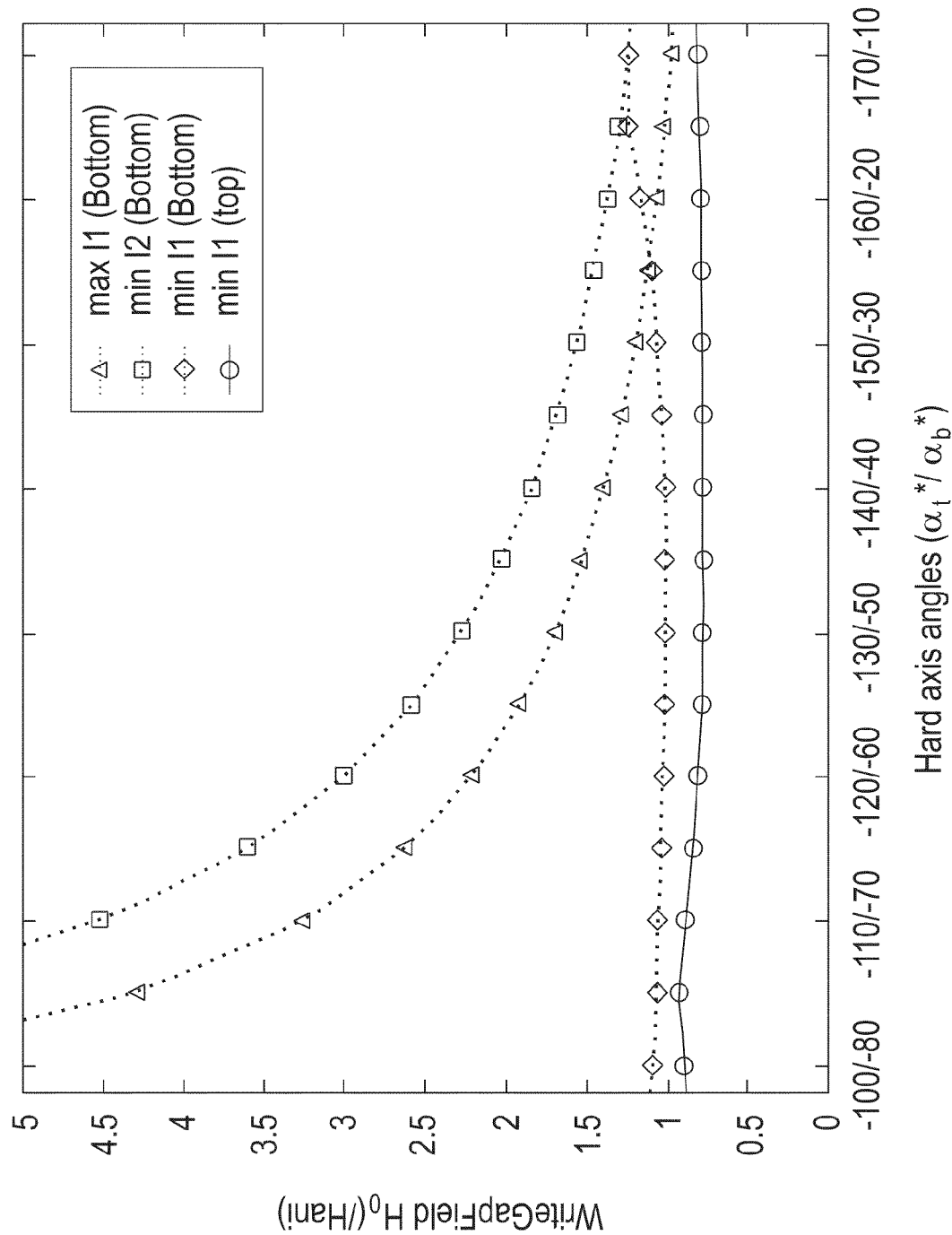
Figure 4C:
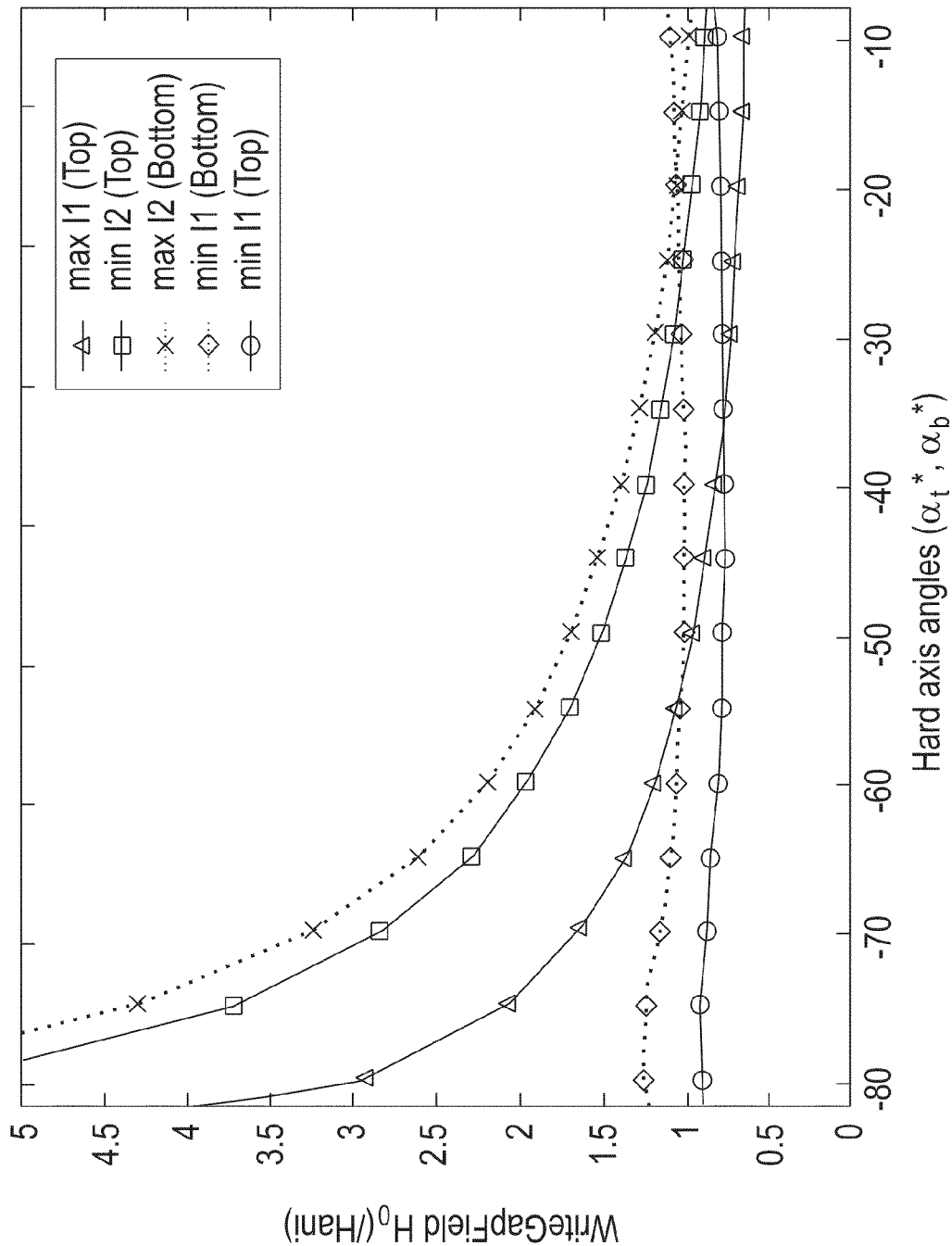
Figure 4D:
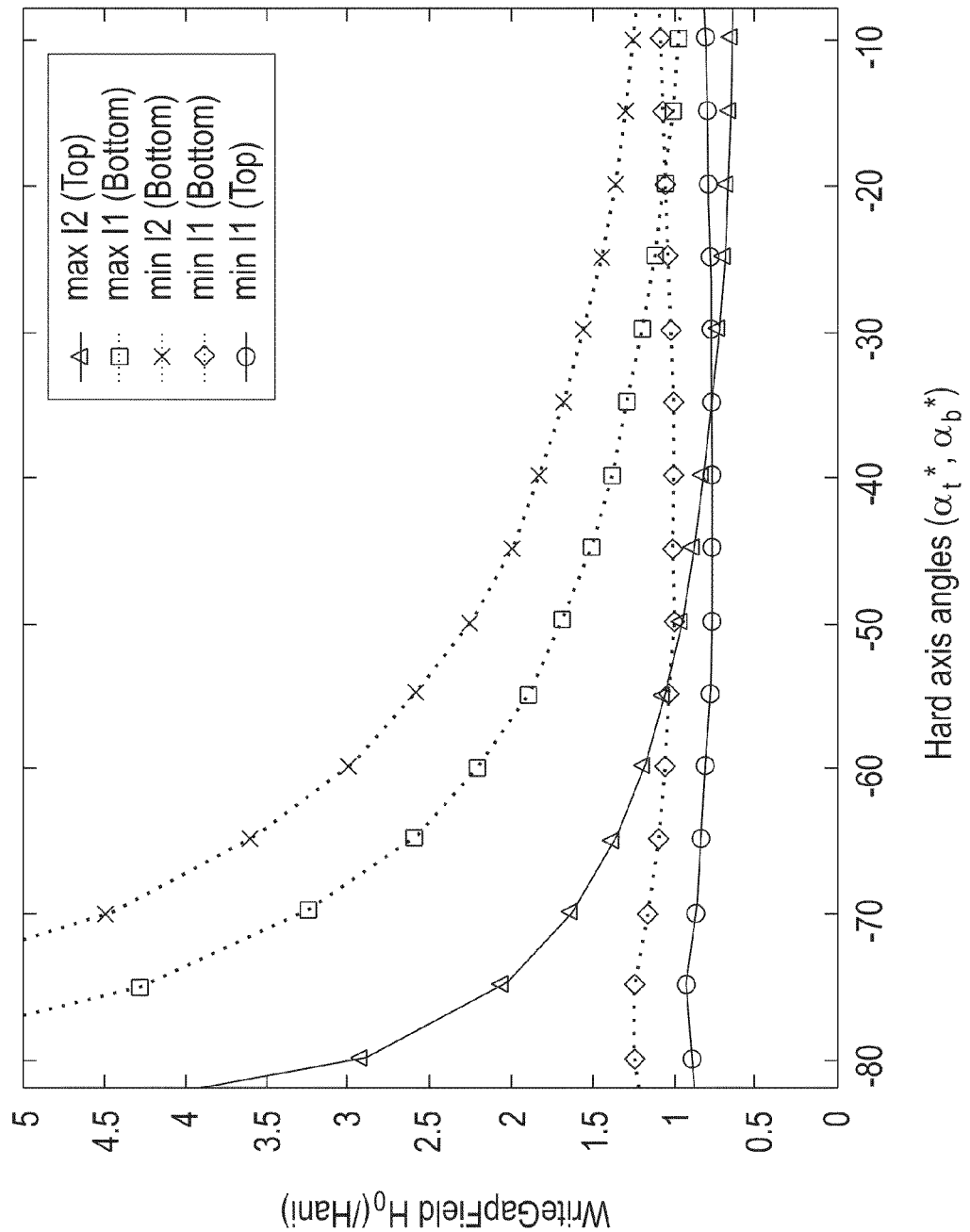
Figure 4E:
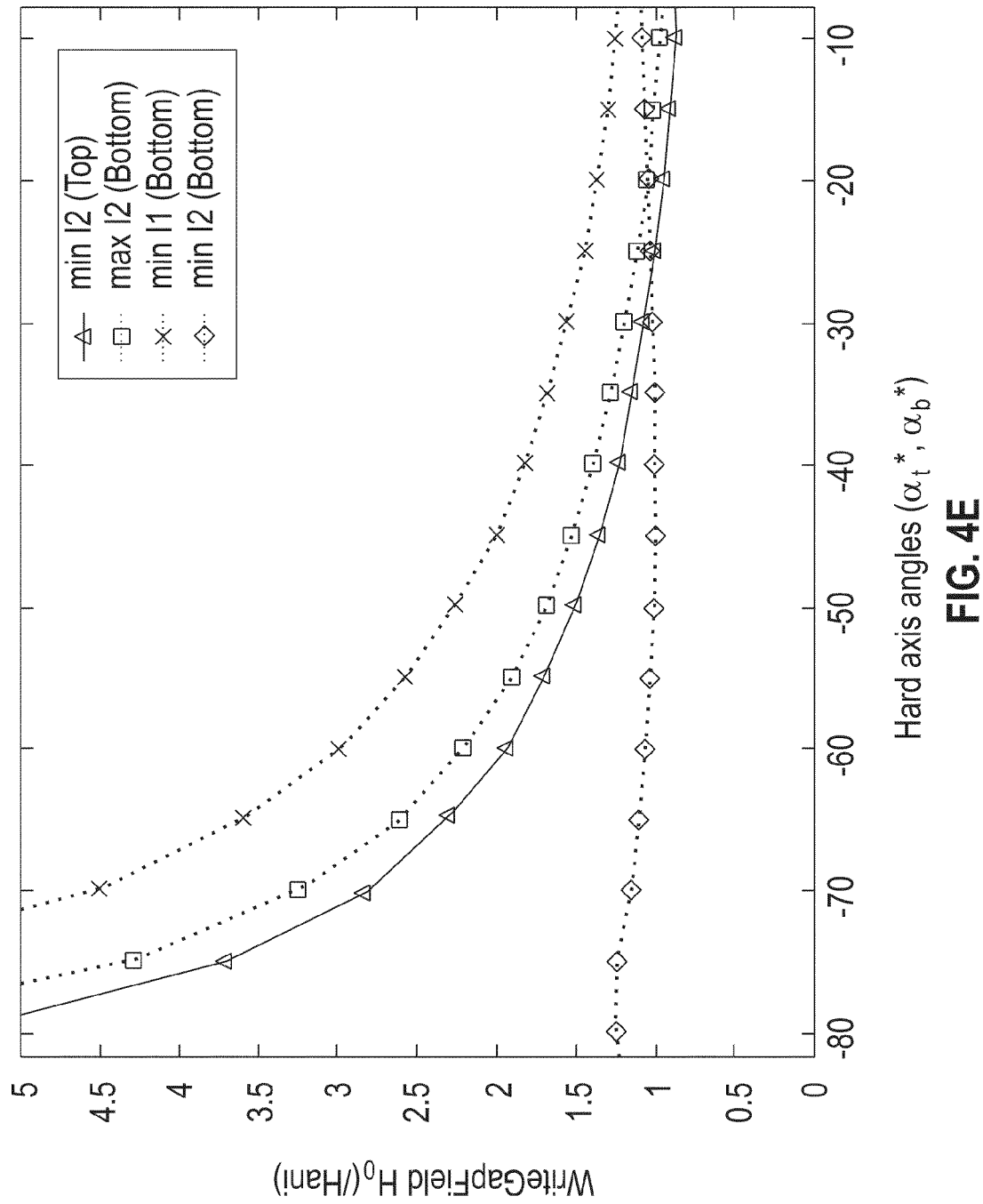
Figure 4F:
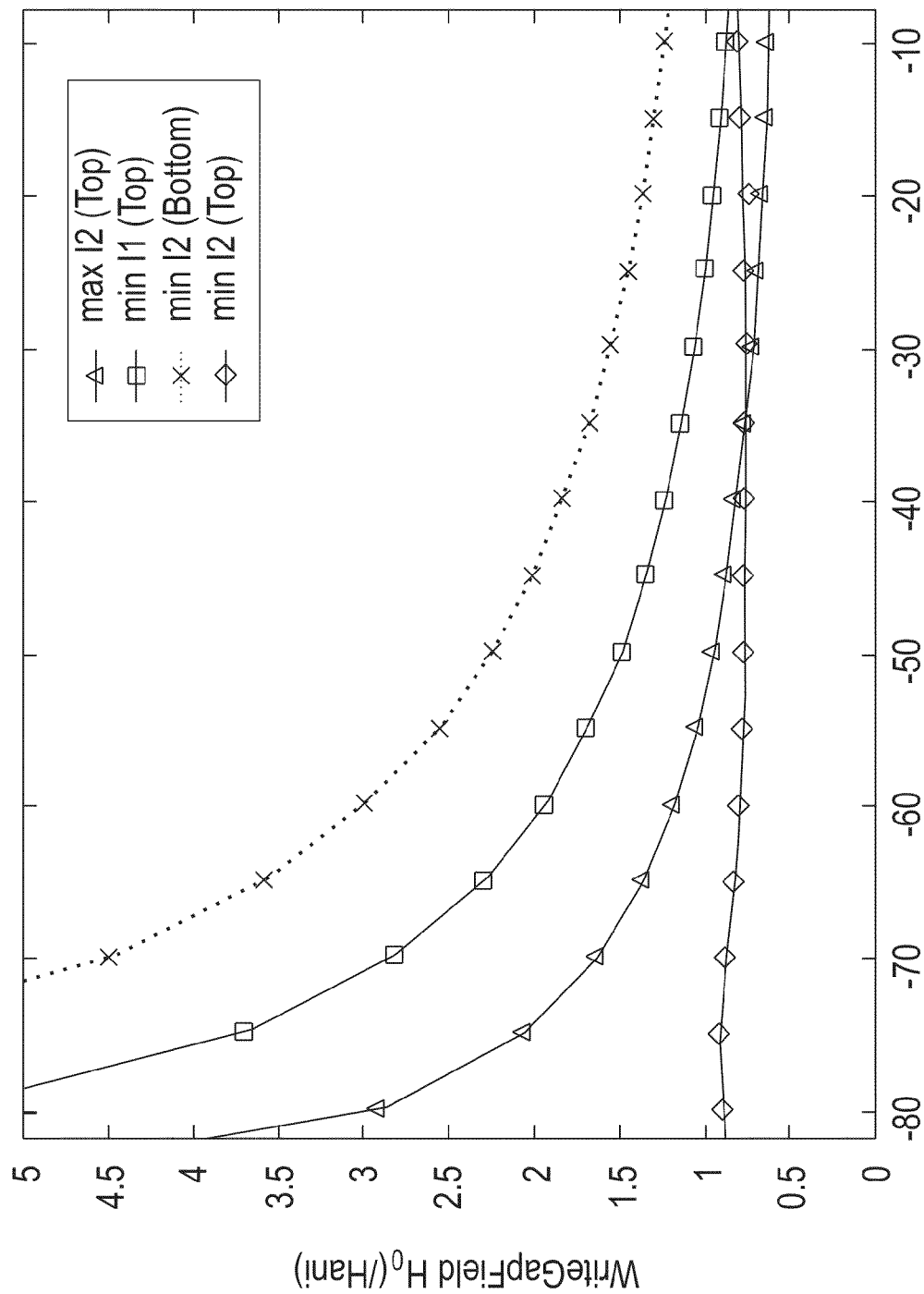

FIGS. 4A, 4B, 4C, 4D, 4E, and 4F (collectively, "FIG. 4") show a calculation of the write current (I1 and I2) for the two-level patterned magnetic media for various ranges of hard axis angle in the top and bottom islands, in accordance with embodiments of the present invention. In FIG. 4, the patterned magnetic medium comprises 30 nm thick top and bottom islands, a 10 nm thick spacer layer, a head-media spacing of 30 nm, and a write gap of 200 nm. Karlqvist head fields have been used to calculate the stray field from the write head. In FIG. 4, the deep gap field (which is directly proportional to the write current) is normalized to the anisotropy field of the island. Each island can have different anisotropy fields. The calculation of I1 and I2 write currents or corresponding deep-gap fields (normalized to the bit anisotropy) allow the top and bottom islands of the patterned medium to be written independently as a function of the hard angle absolute value of $\alpha_t^*$ (solid lines) and $\alpha_b^*$ (dotted lines). In FIG. 4A, $\alpha_t^*$ is between −80 and −10 degrees, and $\alpha_b^*$ is between −180 and −90 degrees. In FIG. 4B, $\alpha_b^*$ is between −80 and −10 degrees, and $\alpha_t$ is between −180 and −90 degrees. In FIG. 4C, $\alpha_t^*$ is between −80 and −10 degrees, and $\alpha_b^*$ is between −90 and 0 degrees. In FIG. 4D, $\alpha_b^*$ is between −80 and −10 degrees, and $\alpha_t^*$ is between −90 and 0 degrees. In FIG. 4E, $\alpha_t^*$ is between −80 and −10 degrees, and $\alpha_b^*$ between −90 and 0 degrees. In FIG. 4F, $\alpha_b^*$ is between −80 and −10 degrees, and $\alpha_t^*$ is between −90 and 0 degrees.

With respect to forward and backward recording directions, if $\alpha_t^*$ is between −80 and −10 degrees, and $\alpha_b^*$ is between −170 and −100 degrees, then the two-level patterned medium can be written simultaneously at the two depths of the medium and independently of the recording direction. In the forward direction (head moving in the +X direction), the medium is written into the A, B, C, or D magnetization state using current I1a, I2a, −I1a or −I2a. In the backward direction (head moving in the −X direction), the angles are reversed and the 4 data bits are written using current I1b, I2b, −I1b and −I2b.

Additionally with respect to forward and backward recording directions, if $\alpha_t^*$ is between −170 and −100 degrees, and $\alpha_b^*$ is between −80 and −10 degrees, then the two-level patterned medium can be written simultaneously at the two levels of the medium and independently of the recording direction. In the forward direction (head moving in the +X direction), the medium is written into the A, B, C, or D magnetization state using current I1b, I2b, −I1b or −I2b. In the backward direction (head moving in the −X direction), the angles are reversed and the 4 data bits are written using current I1a, I2a, −I1a and −I2a.

Figure 5:
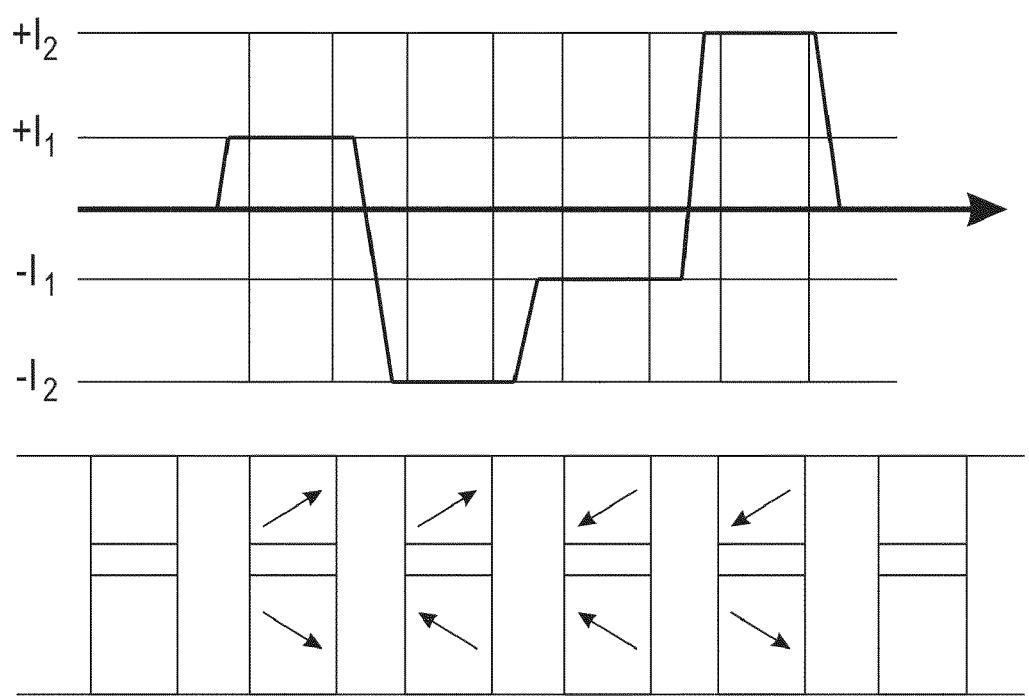
FIG. 5 illustrates a write-current pattern to write consecutive states on a two-level patterned magnetic medium, in accordance with embodiments of the present invention.

FIG. 5 illustrates a write-current pattern to write consecutive states A, C, B, D on a two-level patterned medium, in accordance with embodiments of the present invention. In FIG. 5, $\alpha_t$ is between +10 and +80 degrees, $\alpha_t^* = \alpha_t - 90$. and $\alpha_b$ is between −10 and −80 degrees, $\alpha_b^* = \alpha_b - 90$. The numerical values of ±I1 and ±I2 are determined from the write head characteristics, the head-media spacing, and the thicknesses of the top island, the bottom island and the spacer layer, and the magnetic parameters of the medium (hard axis angles, anisotropy field values, angular dependence of the switching fields), as explained supra. Thus, in contrast with continuous media where the bits can be written everywhere on the magnetic medium, writing on patterned media requires the synchronization of the write current pattern with the pillar pattern.

To determine the precise locations of the pillars as the magnetic head is moving in the X direction, so that required discrete write currents ±I1 and ±I2 are activated exactly when needed to generate the A, C, B, D states in the two pillars, a readback signal of the medium (or readback signal (write after read) or from reference written pillar or servo pillar in the case of multiple heads) may be used to detect the presence of the pillars as the magnetic head advances in the X direction.

For reading two levels of bits of the patterned tilted medium, the magnetic read head 31 in FIG. 6A (or the magnetic read head 36 of FIG. 6C or FIG. 6D) performs reading such as by using a conventional reading sensor (e.g., a magnetoresistive head) that passes above the medium at a given velocity and with a given head-media spacing.

Contrary to conventional continuous media, the readback waveform does not measure transitions of magnetization in the media but rather the amplitude of the stray fields generated by each individual pillar. As a result, for a two-level patterned medium, there are four distinctive waveforms corresponding to the recorded states A, B, C and D.

FIGS. 7A, 7B, 7C, and 7D (collectively, "FIG. 7") depict exemplary readback waveforms for the four magnetization states distributed in five consecutive pillars, in accordance with embodiments of the present invention. In the example of FIG. 7, the magnetic medium has pillars 200 nm long, 70 nm thick, spaced apart by 400 nm, with 30 nm thick top and bottom islands and a 10 nm thick spacer layer, $\alpha_t^* = -60°$, $\alpha_b^* = -120°$, $\alpha_t = 30°$, $\alpha_b = -30°$, $M_{r,t} = M_{r,b}$, and the period of the patterned medium is 600 nm. For the readback calculation, a read gap of 200 nm was assumed with a head/media spacing of 30 nm. Karlquist fields approximation is used both for the calculation of the readback waveforms.

Figure 7A:
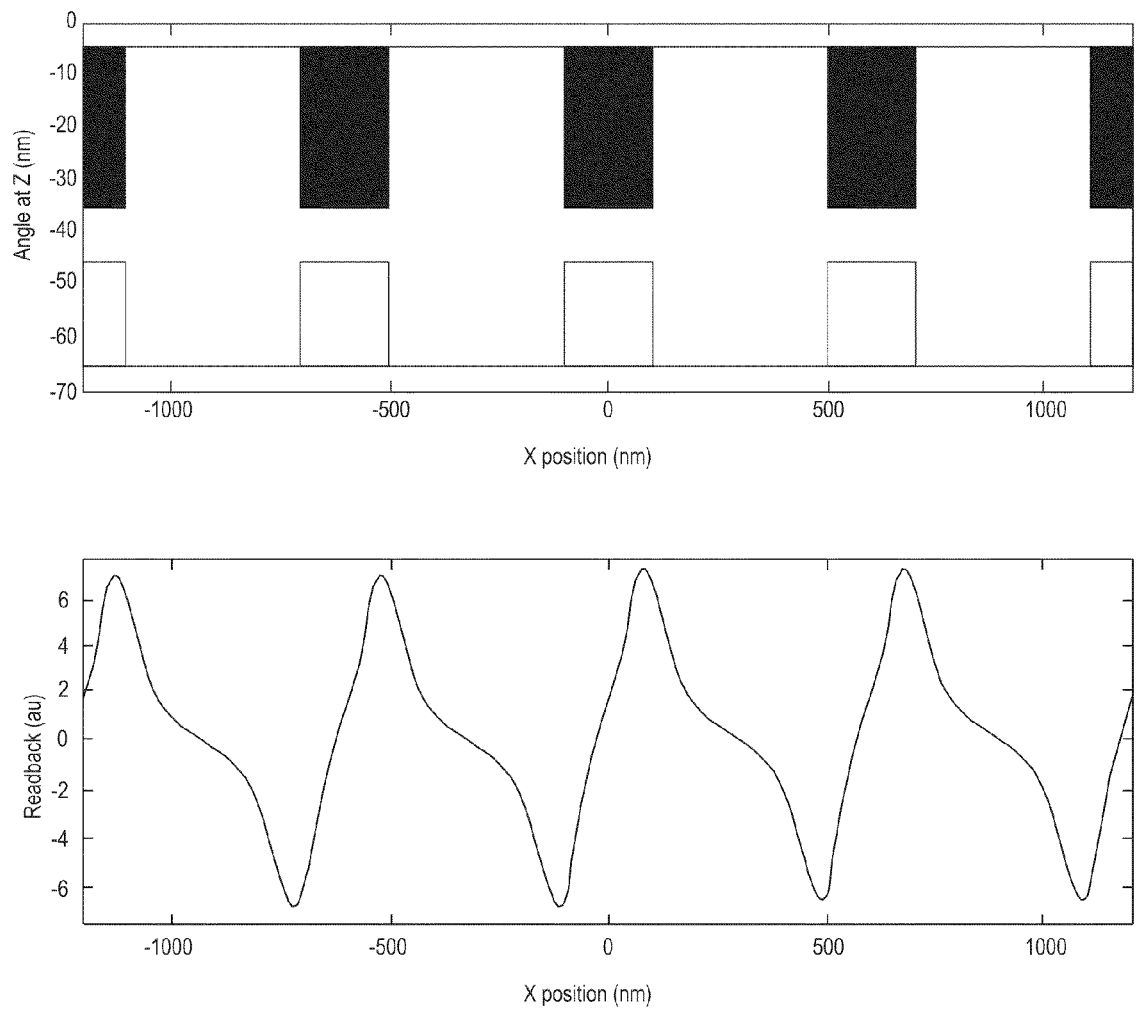
FIGS. 7A, 7B, 7C, and 7D depict exemplary readback waveforms for the four magnetization states distributed in five consecutive pillars, in accordance with embodiments of the present invention.
Figure 7B:
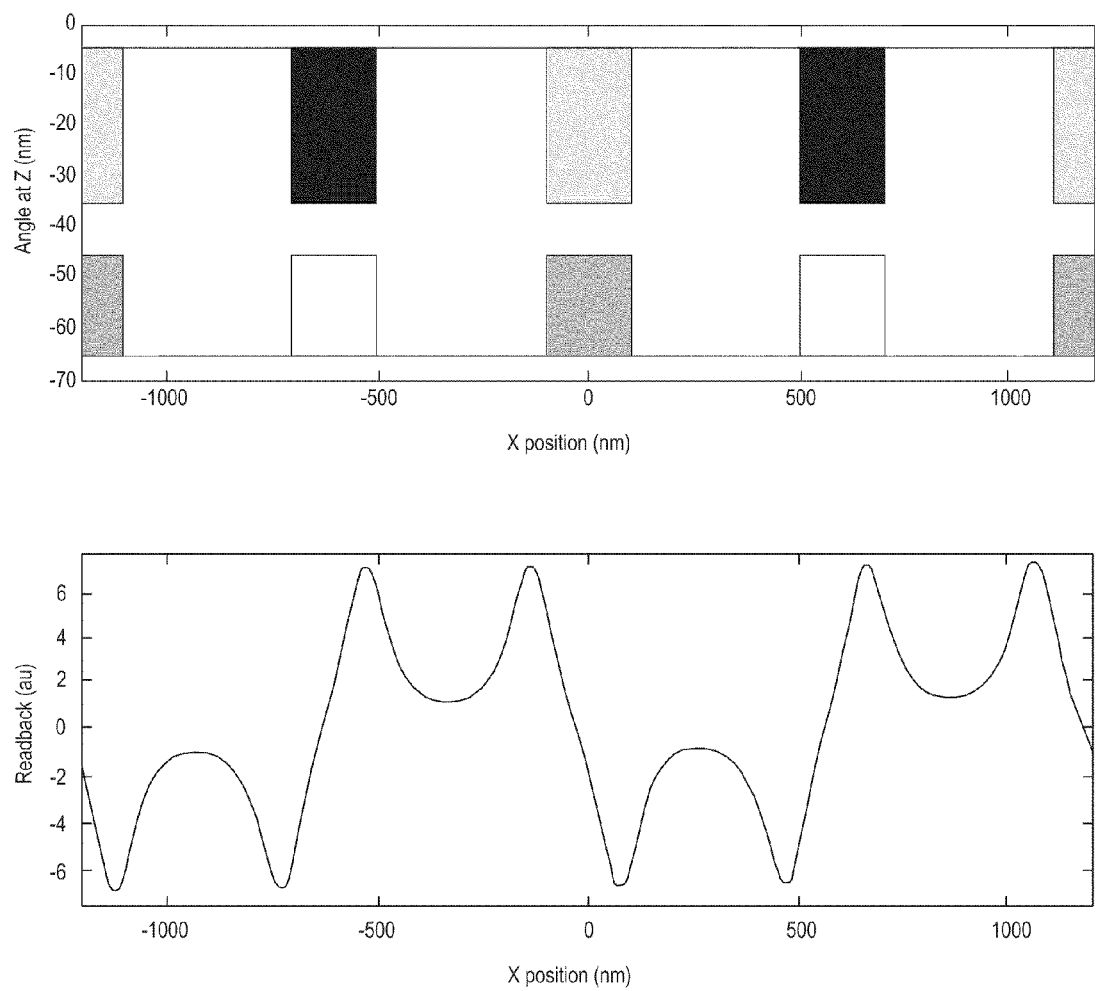
Figure 7C:
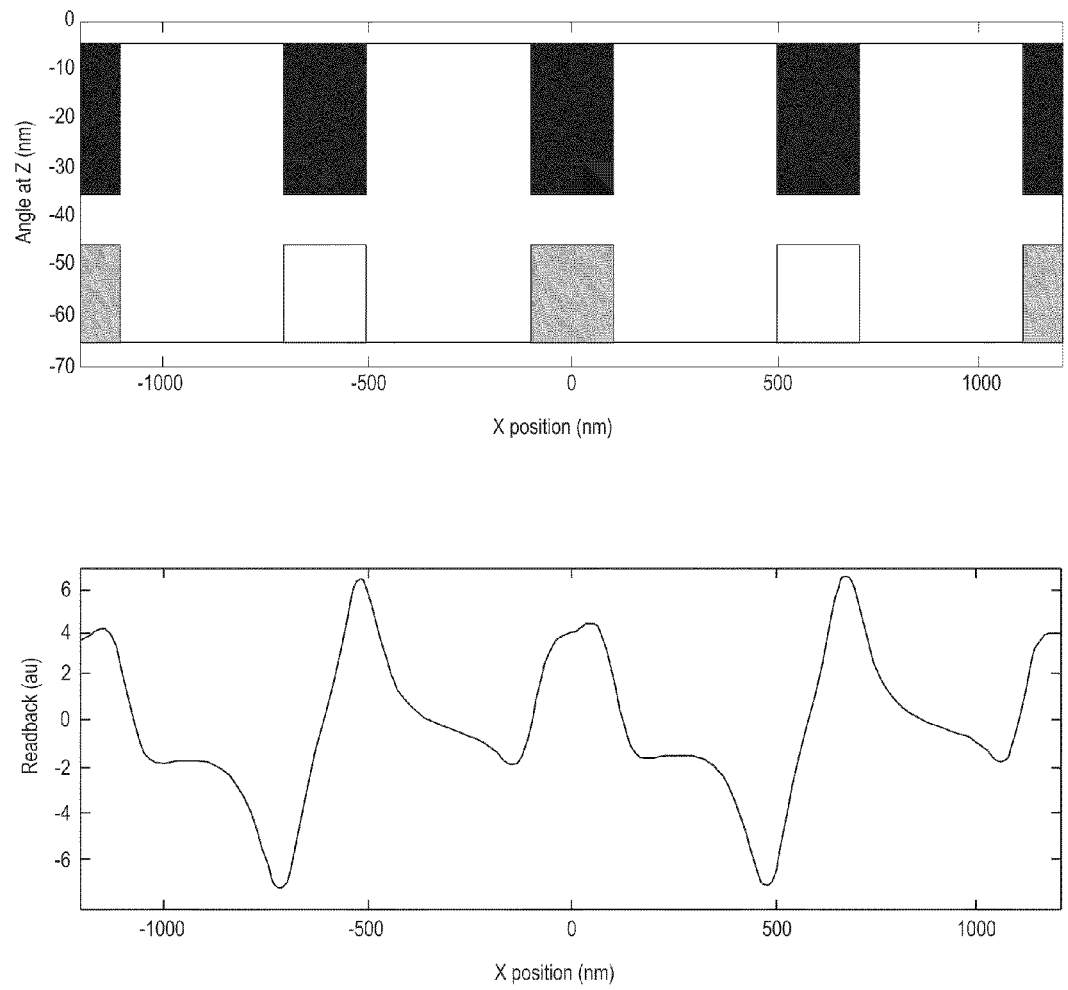
Figure 7D:
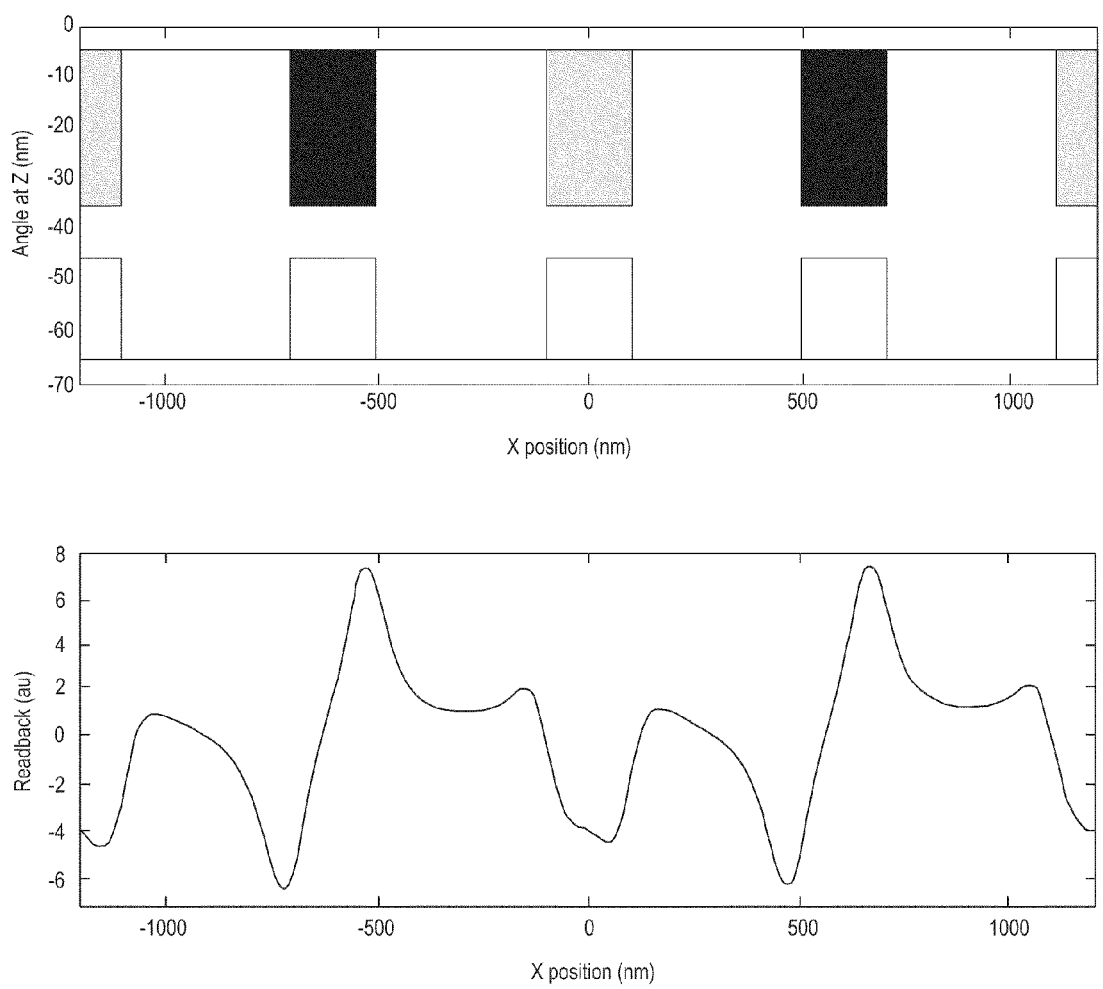

In FIG. 7A, the magnetization states in the five consecutive pillars are A-A-A-A-A. In FIG. 7B, the magnetization states in the five consecutive pillars are B-A-B-A-B. In FIG. 7C, the magnetization states in the five consecutive pillars are C-A-C-A-C. In FIG. 7D, the magnetization states in the five consecutive pillars are D-A-D-A-D. The individual readback waveforms in FIG. 7 are unique for each magnetization state A, B, C, and D, and easily distinguishable for each magnetization state A, B, C, and D.

Figure 8:
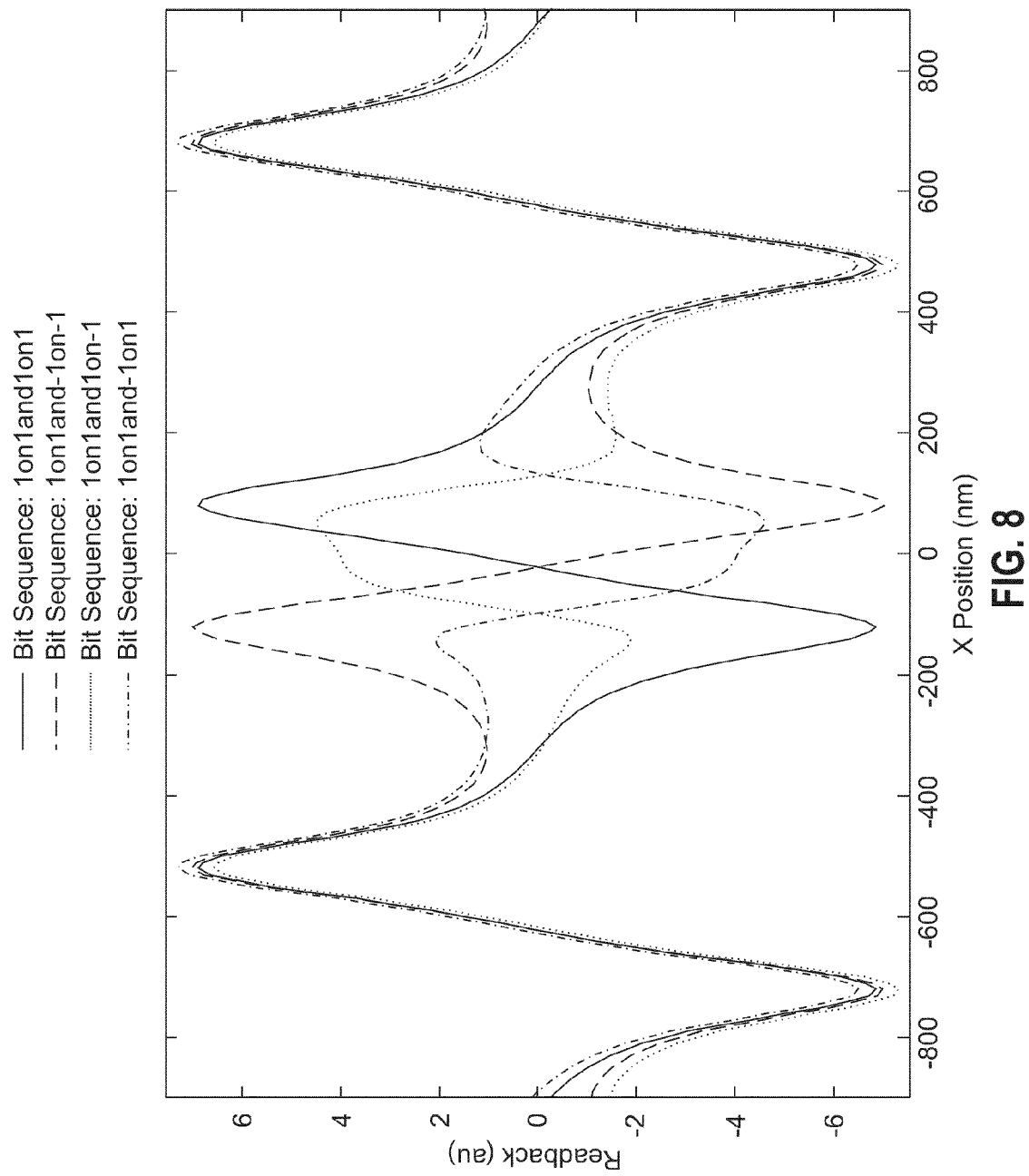
FIG. 8 depicts the readback waveforms of FIG. 7 together in one graphical plot, in accordance with embodiments of the present invention.

FIG. 8 depicts the readback waveforms of FIG. 7 together in one graphical plot, in accordance with embodiments of the present invention. The individual readback waveforms in FIG. 8 are unique for each magnetization state A, B, C, and D, and are easily distinguishable for each magnetization state A, B, C, and D, as may be confirmed by reviewing the waveforms for magnetization states A, B, C, and D at X=0 nm. Note that the amplitude level and shape of each of these readback waveforms can be optimized by the design of the medium and also depends on the write head and read head characteristics.

For a 2-level patterned magnetic medium described supra, the method of the present invention writes magnetic states of the two independent islands of a pillar simultaneously, thus allowing recording with doubled capacity in with a single writing step. The method of the present invention enables reading the magnetization states by decoding unique pulse shapes specific to the magnetization state.

Figure 9:
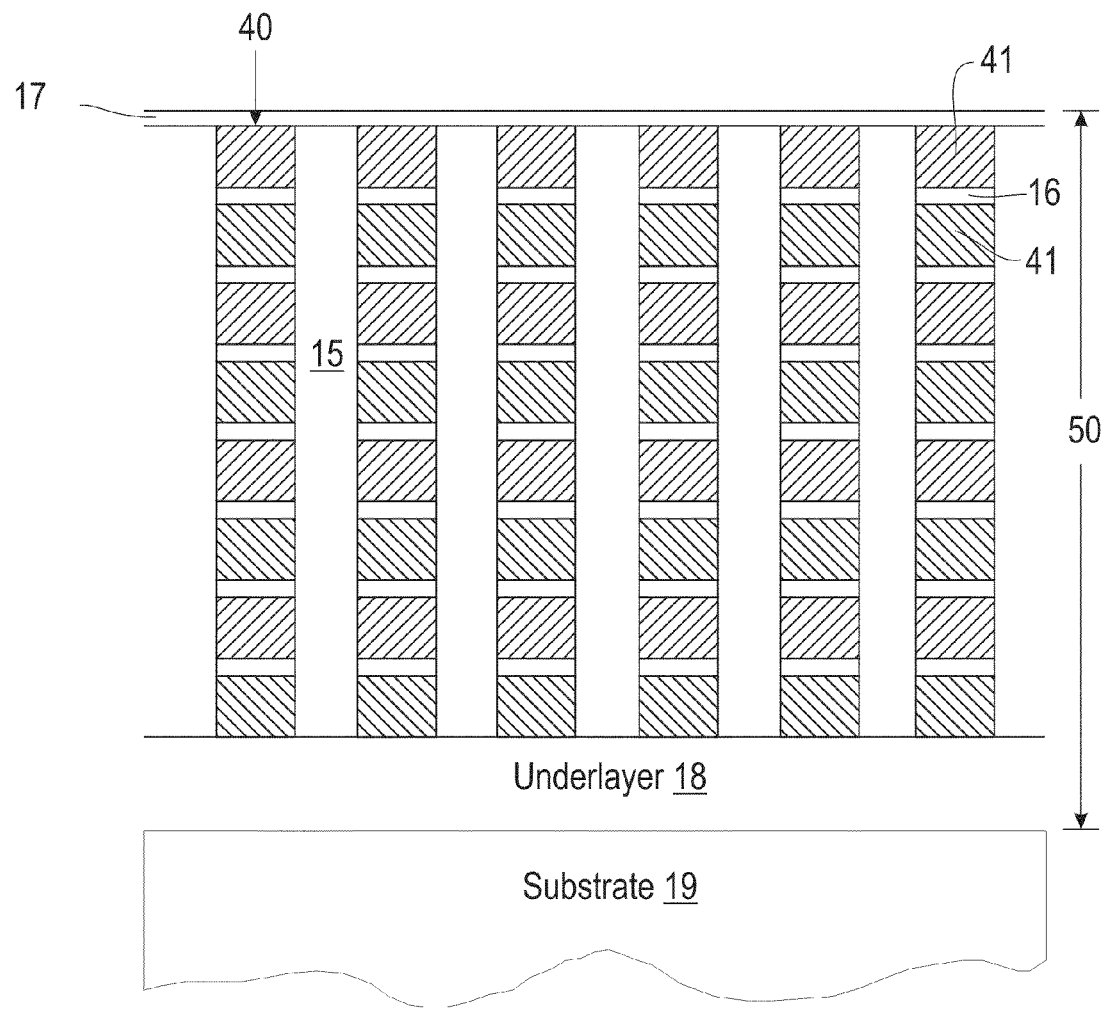
FIG. 9 is a schematic description of a multi-level patterned magnetic medium with more than two levels, in accordance with embodiments of the present invention.

FIG. 9 is a schematic description of a multi-level patterned magnetic medium 50 with N levels such that N is an integer of at least 2. in accordance with embodiments of the present invention. The magnetic medium 50 comprises a recording layer made of individual magnetic pillars 40 spaced apart from each other by non-magnetic material 15. The magnetic medium 50 may include an overcoat 17, and an under-layer 18 between the magnetic pillars 40 and a substrate 19.

Each magnetic pillar 40 comprises N magnetic islands 41 that are magnetically independent. In one embodiment, the islands are isolated from each other by a non-magnetic spacer layer 16. Each island 41 is a single-domain particle or an assembly of particles that behave as a single magnetic volume. A pair of islands 41 can be written in a single write step as described supra, resulting in a reduction in writing steps by a factor of 2 in comparison with existing writing methods. For cases of N>2. the two islands in the pair of islands 41 are not required to be two physically consecutive islands (i.e., two neighboring islands with no other island disposed therebetween).

In one embodiment, N is an even or odd integer of at least 2.

Figure 10:
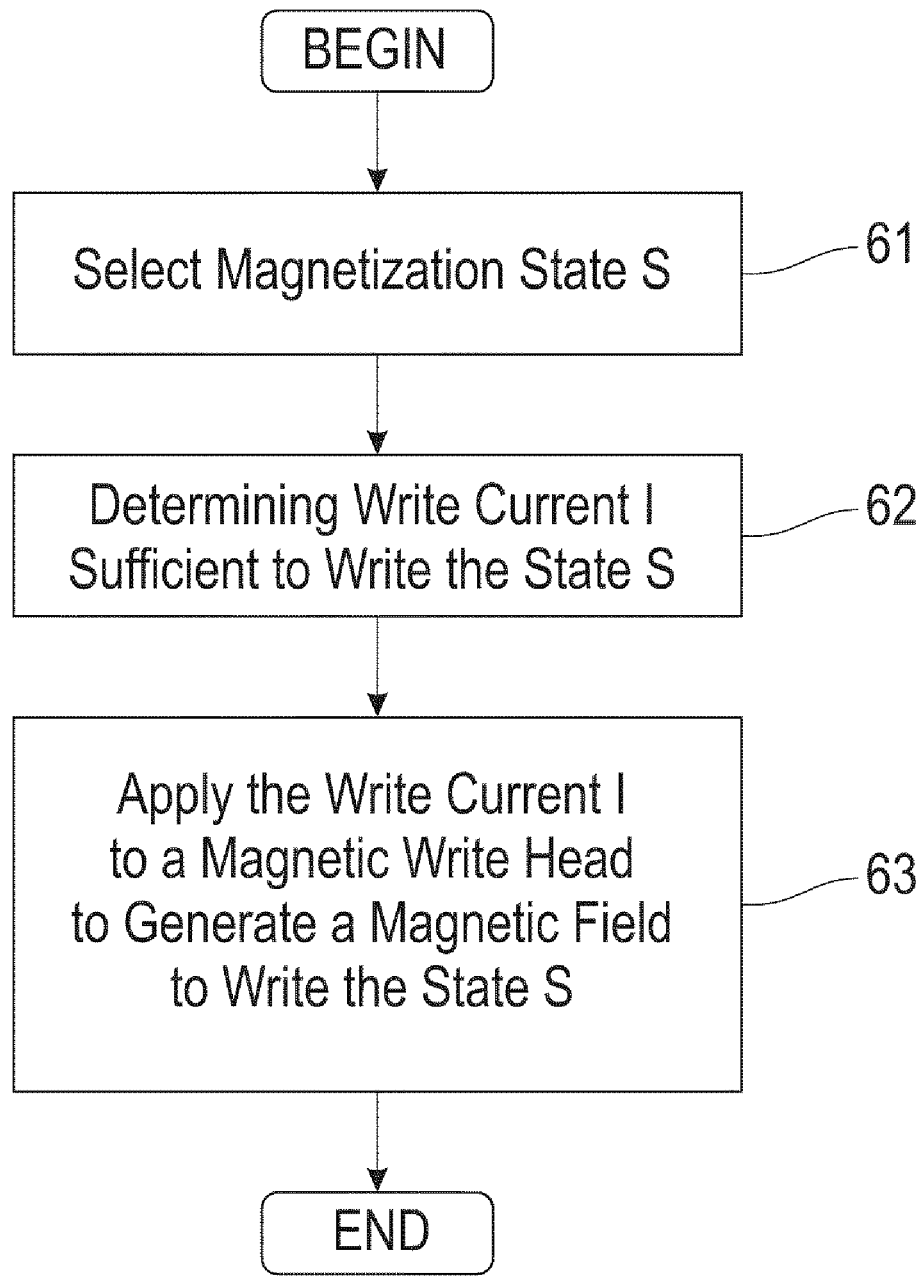
FIG. 10 is a flow chart of a method for writing a magnetization state in a multi-level patterned magnetic medium, in accordance with embodiments of the present invention.

FIG. 10 is a flow chart of a method for writing a magnetization state in a multi-level patterned magnetic medium, in accordance with embodiments of the present invention. The magnetic medium comprises a plurality of pillars, wherein each pillar is distributed in an X direction and a Y direction. Consecutive pillars of the plurality of pillars are separated by spacer material (e.g., non-magnetic material). Each pillar comprises N magnetic islands distributed in a Z direction, wherein the X, Y, and Z directions are mutually orthogonal. In one embodiment, consecutive magnetic islands in each pillar are separated by non-magnetic spacer material. The method of FIG. 10 comprises steps 61-63.

Step 61 selects a magnetization state S=[S1; S2] comprising a magnetic state (S1) in a first magnetic island of the N magnetic islands of a first pillar of the plurality of pillars and a magnetic state (S2) in a second magnetic island of the N magnetic islands of the first pillar. N is at least 2.

Step 62 determines a write current (I) sufficient to write the magnetization state [S1; S2] from a relationship (R) involving $\alpha_1^*$, $\alpha_2^*$, $H_1$, $H_2$, $\phi_1$ and $\phi_2$, wherein $H_1$ and $H_2$ respectively denote a magnetic field strength in the first magnetic island and the second magnetic island, wherein and $\phi_1$ and $\phi_2$ respectively denote a magnetic field angle with respect to the X direction in the first magnetic island and the second magnetic island, wherein $\alpha_1^*$ and $\alpha_2^*$ are a first tilt angle and a second tilt angle at which a magnetic hard axis of the first magnetic island and the second magnetic island are respectively oriented with respect to the X direction, and wherein at least one tilt angle of the first tilt angle $\alpha_1^*$ and the second tilt angle $\alpha_2^*$ is between −90 and 0 degrees.

The magnetization state [S1; S2] is a state A=[+1,+1]. a state B=[−1,−1]. a state C=[+1,−1]. or a state D=[−1,+1]. wherein the magnetic state S1 is respectively +1 or −1 if a magnetization of the first magnetic island is oriented along its easy axis, at or opposite to the angle $\alpha_1$ with respect to the X direction, and wherein the magnetic state S2 is respectively +1 or −1 if a magnetization of the second magnetic island is oriented along its easy axis at or opposite to the angle $\alpha_2$ with respect to the X direction.

Step 63 applies the write current I to a magnetic write head moving in the X direction to generate in the first island and in the second island the magnetic fields $H_1$ and $H_2$ respectively, oriented at the field angle $\phi_1$ and $\phi_2$ respectively, resulting in writing the magnetization state [S1; S2] by simultaneously writing the magnetic state S1 in the first magnetic island and the magnetic state S2 in the second magnetic island.

The write current I will write the magnetization state [S1; S2] in the first and second island of the N islands as described supra for step 63. If N>2. the write current I may also write the remaining (N−2) islands of the N islands in a manner that depends on the magnetic properties of the remaining (N−2) islands of the N islands. In one embodiment, the remaining (N−2) islands are not being used and their magnetic states are of no concern while the magnetization state [S1; S2] is being written in the first and second islands, so that it does not matter in this embodiment what is specifically written in the remaining (N−2) islands. What may be written in the remaining (N−2) islands will contribute to the unique readback waveform of the magnetization state [S1; S2]. And this readback waveform will necessarily be different to the readback waveforms corresponding to the three other magnetization states.

Figure 19:
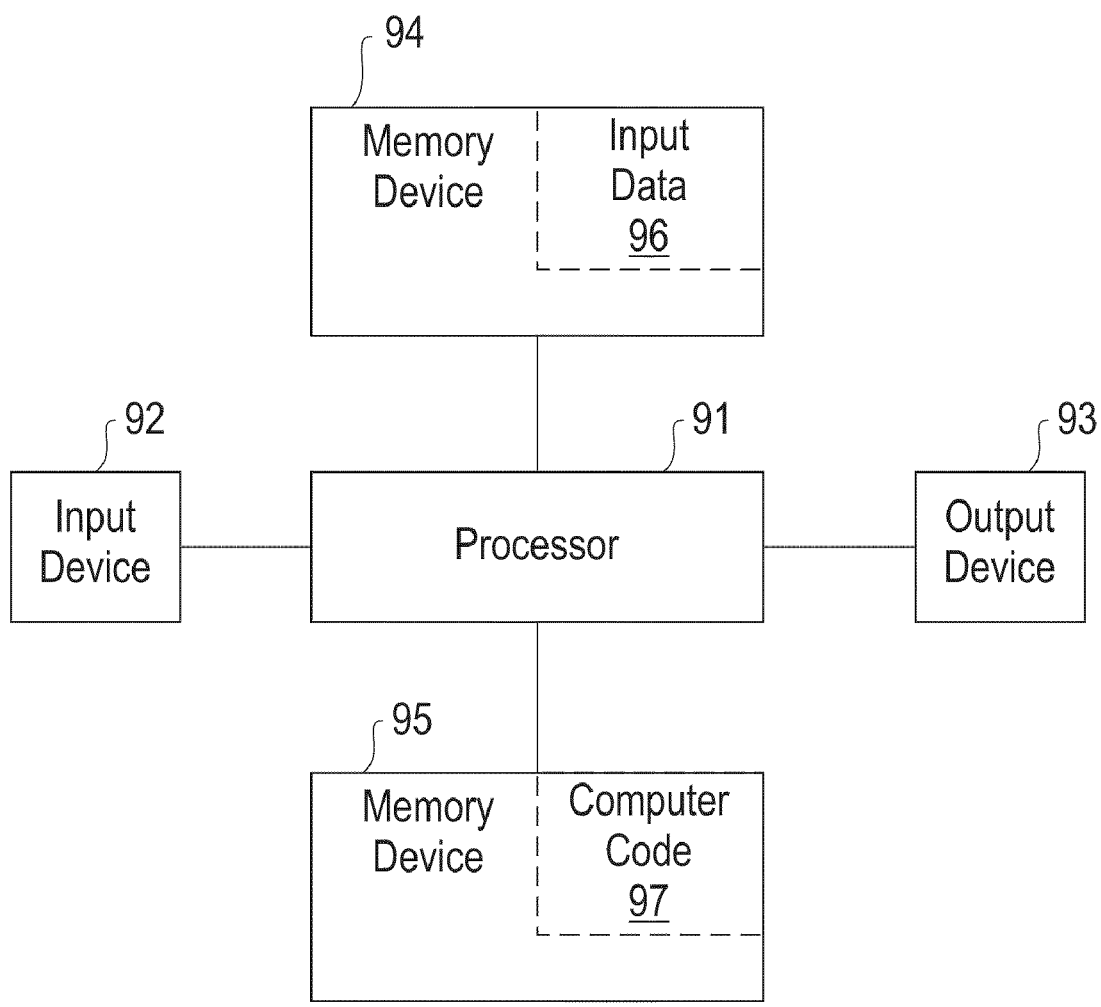
FIG. 19 illustrates a computer system used for executing software to implement the methodology of the present invention.

In one embodiment, steps 61-63 may be implemented in software via the computer system 90 of FIG. 19. The software executes selecting the magnetization state [S1; S2] in step 61, executes determining the write current I in step 62, and executes issuing a command for applying the write current I to the magnetic write head in step 63 which causes the magnetic write head to write the magnetization state [S1; S2] by simultaneously writing the magnetic state S1 in the first magnetic island and the magnetic state S2 in the second magnetic island.

Figure 11:
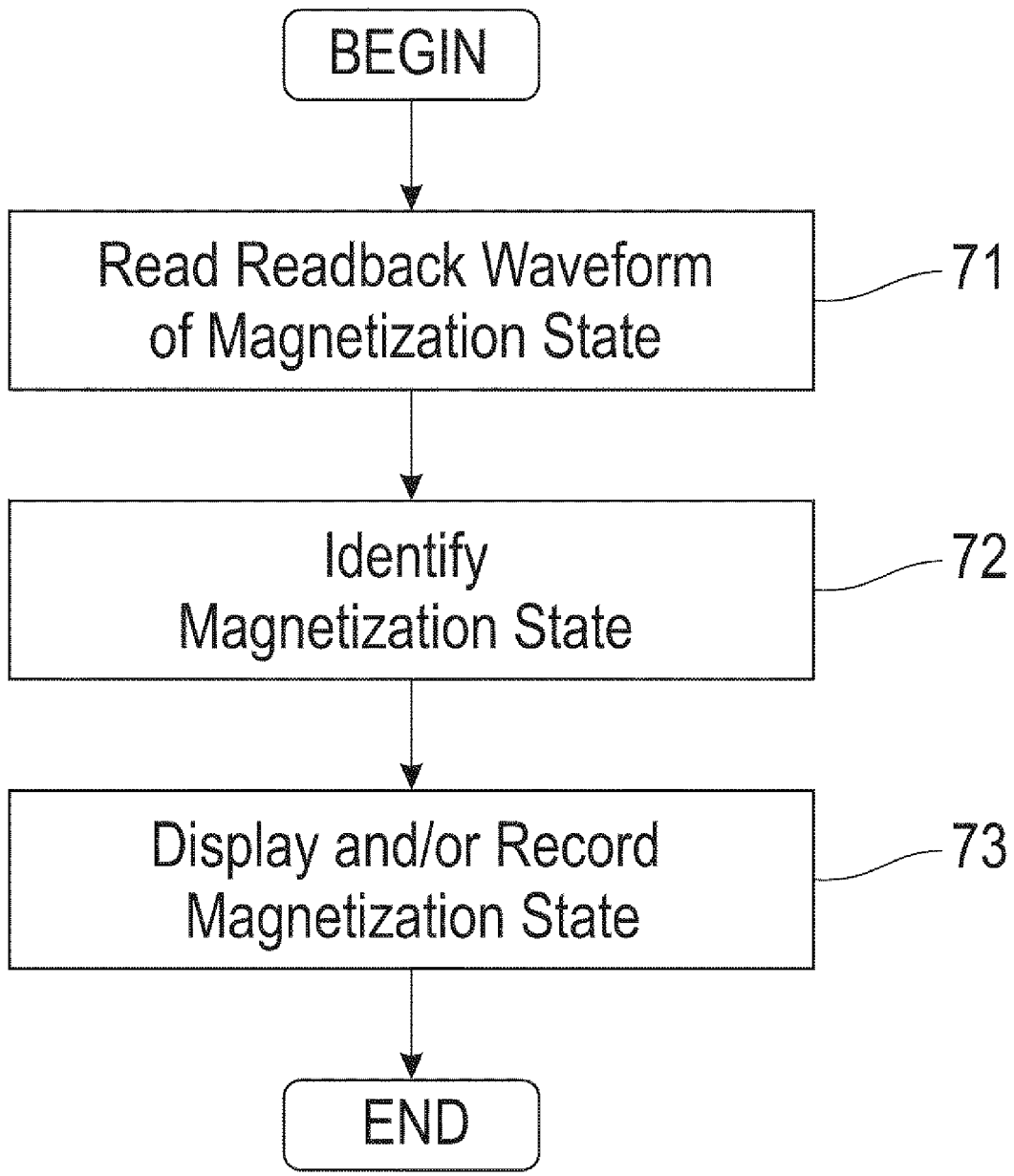
FIG. 11 is a flow chart of a method for reading magnetization states from a two-level patterned magnetic medium, in accordance with embodiments of the present invention.

FIG. 11 is a flow chart of a method for reading magnetization states from a two-level patterned magnetic medium, in accordance with embodiments of the present invention. The magnetic medium comprises a plurality of pillars distributed in a first and a second direction Consecutive pillars of the plurality of pillars are separated by non-magnetic material. Each pillar comprises two magnetic islands distributed in a third direction orthogonal to the first and second directions. In one embodiment, the two magnetic islands in each pillar are separated by non-magnetic spacer material. The first, second, and third directions respectively correspond to the X, Y, and Z directions discussed supra with respect to FIG. 1. The method of FIG. 11 comprises steps 71-73.

Step 71 reads, by a magnetic read head moving in the X direction, a readback waveform (W) specific to a magnetization state [S1; S2] that comprises a magnetic state S1 in a first magnetic island of the two magnetic islands and a magnetic state S2 in a second magnetic island of the two magnetic islands of the first pillar. The first magnetic island and the second magnetic island have a magnetic easy axis respectively oriented at a first tilt angle ($\alpha_1$) and a second tilt angle ($\alpha_2$) with respect to the X direction, wherein $\alpha_1$ and $\alpha_2$ satisfy a condition selected from the group consisting of $\alpha_1 \neq \alpha_2$, either or both of $a_i$ and $a_2$ differing from 0, 90, 180. and 270 degrees, and combinations thereof The first magnetic layer and the second magnetic layer have a magnetic hard axis respectively oriented at a first tilt angle ($\alpha_1^*$) and a second tilt angle ($\alpha_2^*$) with respect to the X direction. In one embodiment, at least one tilt angle of the two tilt angles ($\alpha_1^*$) and ($\alpha_2^*$) is between −90 and 0 degrees Step 72 decodes the readback waveform W from step 71 to identify the magnetization state [S1; S2] from the readback waveform W resulting from said reading.

Step 73 displays and/or records the magnetization state [S1; S2] identified in step 72. For example, the information state corresponding to the readback waveform W may be displayed on a display device of the computer system 90 of FIG. 19 and/or recorded (i.e., written) in a memory device of the computer system 90 of FIG. 19.

In one embodiment, steps 71-73 may be implemented in software via the computer system 90 of FIG. 19. In step 71, the software executes issuing a command for reading, by the magnetic read head, the readback waveform W (which causes the magnetic read head to read the readback waveform W). In step 72, the software decodes the readback waveform W to identify the magnetization state [S1; S2]. In step 73, the software executes displaying the magnetization state [S1; S2] identified in step 72.

Figure 12:
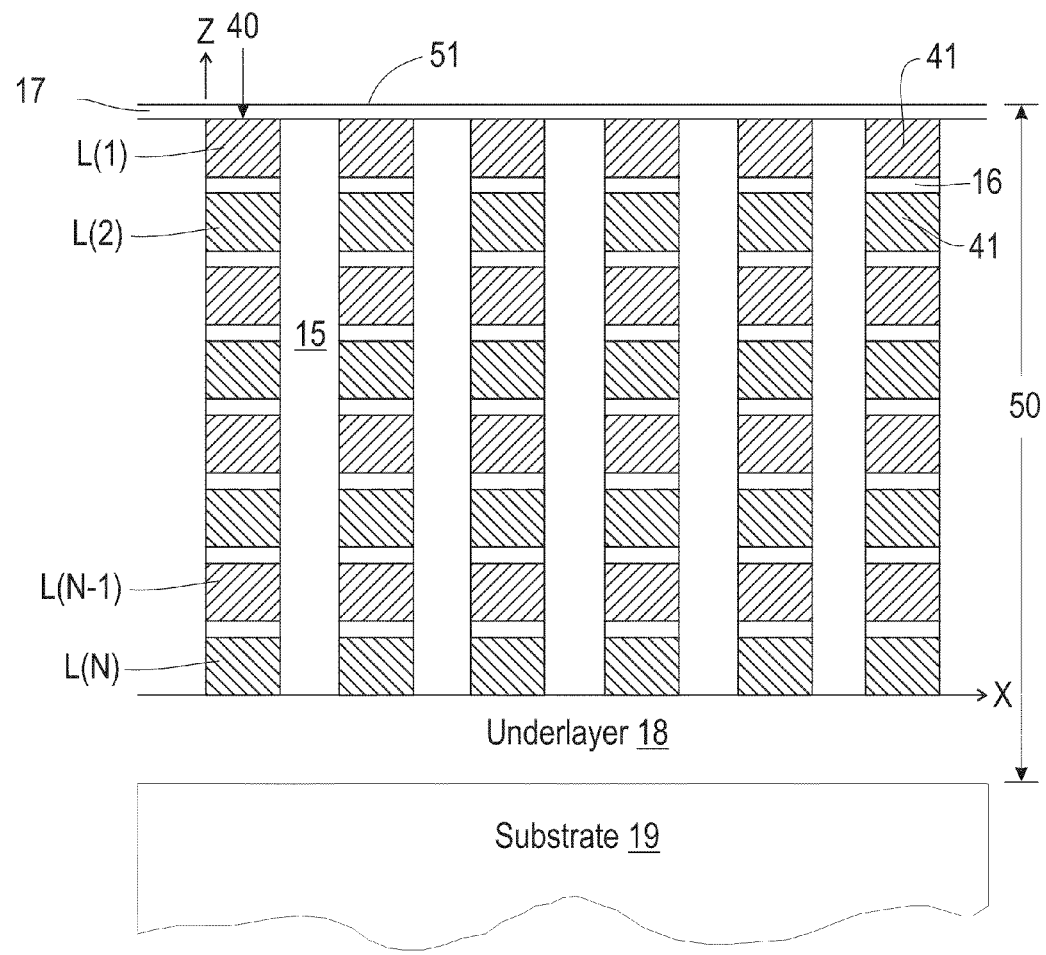
FIG. 12 is a schematic description of a multi-level patterned magnetic medium configured to have magnetization states recorded in island groups of the magnetic medium, in accordance with embodiments of the present invention.

FIG. 12 is a schematic description of a multi-level patterned magnetic medium 50 configured to have magnetization states recorded in island groups of the magnetic medium, in accordance with embodiments of the present invention. The magnetic medium 50 comprises a recording medium made of individual magnetic pillars 40 spaced apart from each other by non-magnetic material 15. The magnetic medium 50 may include an overcoat 17, and an under-layer 18 between the magnetic pillars 40 and a substrate 19.

Each magnetic pillar 40 comprises N magnetic islands 41, wherein N is an even or odd integer of at least 3. The N magnetic islands 41 are magnetically independent and denoted as $L(1), L(2), \ldots, L(N)$. In one embodiment, the N islands are isolated from one another by a non-magnetic spacer layer 16. Each island 41 is a single-domain particle or an assembly of particles that behave as a single magnetic volume. Each pair of islands 41 can be written in a single write step as described supra, resulting in a reduction in writing steps by a factor of 2 in comparison with existing writing methods. For N>2, the two islands in each pair of islands 41 may be any two islands of the N islands and are not required to be two physically consecutive islands (i.e., two neighboring islands with no other island disposed therebetween).

A subset of the N magnetic islands is M island groups. The M island groups consist of P pairs of islands and Q single islands (i.e., P+Q=M), subject to $N \geq 3$, $2 \leq M \leq N-1$, $P \geq 1$, and $Q \geq 0$. Thus, each island group of the M island groups is either a pair of islands of the P pairs of islands or a single island of the Q single islands. Each single island within the M island groups is an unpaired island. In one embodiment, 2P+Q=N. In one embodiment, 2P+Q<N. In one embodiment, Q=0. In one embodiment, Q=0 and M<N. In one embodiment, Q=0 and M=N/2 or (N−1)/2 if N is even or odd, respectively. In one embodiment, $Q \geq 1$. In one embodiment, $P \geq 2$.

Each pair of islands of the P pairs of islands can be written in a single write step as described supra, resulting in a reduction in writing steps by a factor of 2 in comparison with existing writing methods. The selection of the write current for each island pair is a choice between +I1, +I2, −I1, −I2 to write the magnetization state A, B, C, or D for that particular pair as described supra, wherein ±I1 denotes the write currents ±I1a, ±I1b, ±I1c, ±I1d, ±I1e, ±I1f described supra, and wherein ±I2 denotes the write currents ±I2a, ±I2b, ±I2c, ±I2d, ±I2e, ±I2f described supra.

The selection of the write current for each single island of the Q single islands is a choice between a write current of ±I to write the magnetization state as a magnetic state of +1 or −1 if the magnetization is oriented at or opposite to, respectively, a tilt angle (α) at which an easy axis of the single island is oriented with respect to the X direction. In order to cause a state of +1 or −1 to be written, the write current of ±I must be of sufficient magnitude to generate a magnetic field that exceeds the switching field of the single island.

In one embodiment, an assist mechanism (e.g. thermal assist to magnetization reversal or microwave assist to magnetization reversal) reduces the switching field of at least one island group of the M island groups. For example, a microwave assist mechanism may apply microwave energy resulting from microwave fields of specific amplitude and specific frequency to assist magnetization reversal of at least one island of the islands $L(1), L(2), \ldots L(N)$ by reducing the switching field in each island of the at least one island. For example, a thermal assist mechanism may apply heat to at least one island of the islands $L(1), L(2), \ldots L(N)$ to increase the temperature in each island of the at least one island to a temperature less than the island's Curie temperature, wherein the increased temperature reduces the switching field in each island of the at least one island. In one embodiment, heat may be applied to a top surface 51 of the magnetic medium 50 to generate a temperature gradient of decreasing temperature from island L(1) to island L(2) to . . . island L(N). In one embodiment, heat is applied to all islands of the islands $L(1), L(2), \ldots L(N)$. In one embodiment, heat is selectively applied to fewer islands than all islands of the islands $L(1), L(2), \ldots L(N)$.

Figure 13:
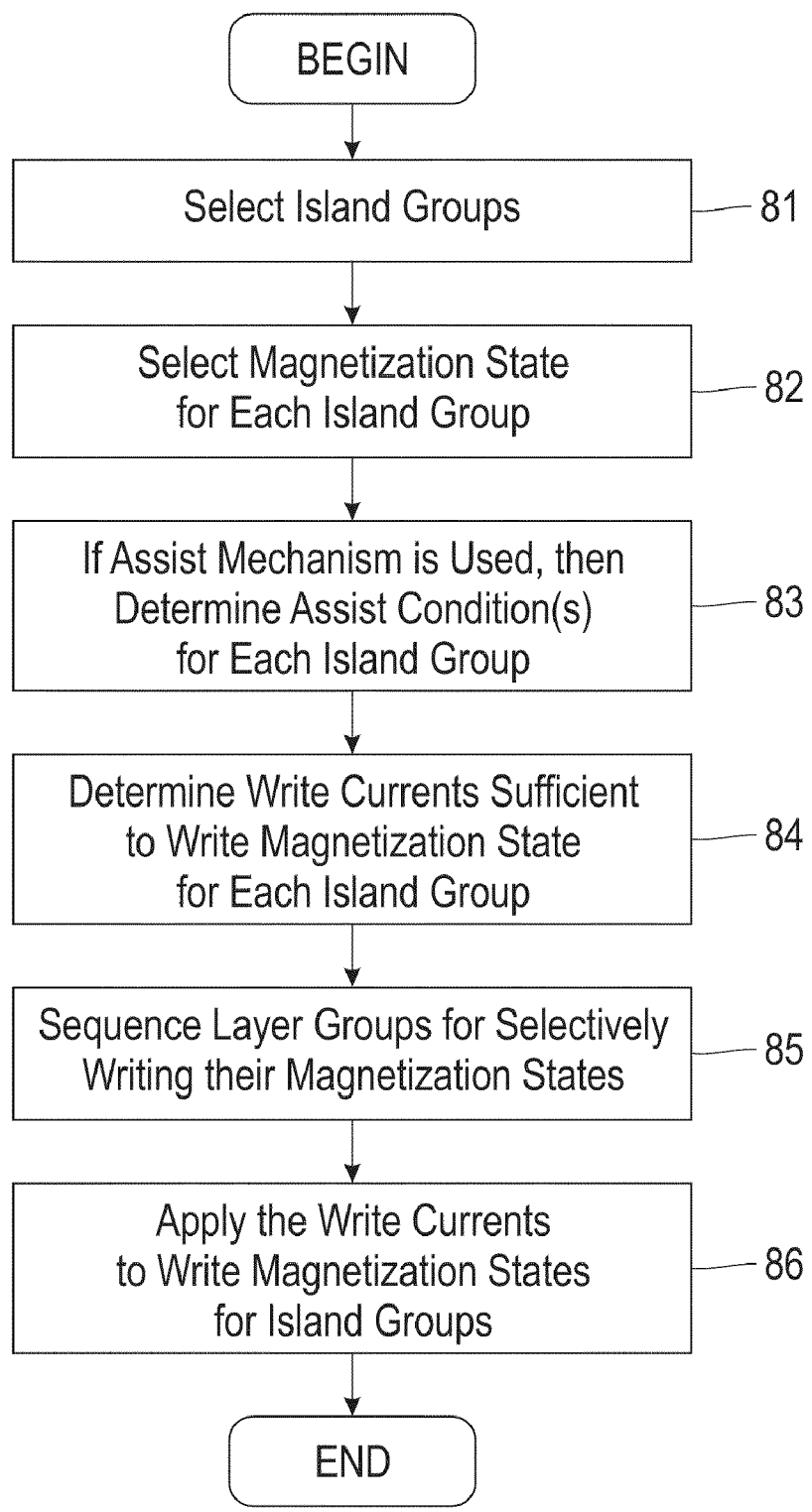
FIG. 13 is a flow chart of a method for writing magnetization states in island groups of FIG. 12, in accordance with embodiments of the present invention.

FIG. 13 is a flow chart of a method for writing magnetization states in island groups of FIG. 12, in accordance with embodiments of the present invention. FIG. 13 comprises steps 81-86.

Step 81 selects the M island groups from the N islands of FIG. 12, which includes selecting the P pairs of islands and the Q single islands. The M island groups are denoted as island groups $G(1), G(2), \ldots, G(M)$.

Step 82 selects the magnetization states $S(1), S(2), \ldots, S(M)$ corresponding to the island groups $G(1), G(2), \ldots, G(M)$, respectively.

If island group G(m) (m selected from 1, 2, . . . , M) is an island pair, then the magnetization state S(m) is denoted as [S1; S2](m) consisting of a magnetic state (S1) in a first magnetic island of the island group G(m) and a magnetic state (S2) in a second magnetic island of the island group G(m), wherein [S1; S2](m) is the magnetization state of A, B, C, or D described supra.

If island group G(m) (m selected from 1, 2, . . . M) is a single island, then the magnetization state S(m) is the magnetic state of +1 or −1 as described supra.

Step 83 is performed if an assist mechanism is used. Step 83 determines conditions $C(1), C(2), \ldots, C(M)$ that would result from applying energy (e.g., heat or microwave energy resulting from microwave fields of specific amplitude and specific frequency) to assist magnetization reversal of the island groups $G(1), G(2), \ldots G(M)$ by reducing switching fields of the island groups $G(1), G(2), \ldots, G(M)$, respectively.

If a thermal assist mechanism is used, then the conditions $C(1), C(2), \ldots C(M)$ are the temperatures $T(1), T(2), \ldots, T(M)$ that would result from applying heat to the island groups $G(1), G(2), \ldots, G(M)$, respectively. For each island group G(m) to which no heat or negligible heat is applied, the temperature T(m) is the environmental temperature (e.g., room temperature) that exists in the absence of applied heat.

Step 84 determines write currents $I(1), I(2), \ldots, I(M)$ sufficient to write the magnetization states $S(1), S(2), \ldots, S(M)$ corresponding to the island groups $G(1), G(2), \ldots, G(M)$, respectively.

As discussed supra, the write current that is sufficient to write the magnetization state S(m)=[S1; S2](m) for the island group G(m) is determined from a relationship (R) involving $\alpha_1^*$, $\alpha_2^*$, $H_1$, $H_2$, $\phi_1$ and $\phi_2$, wherein $H_1$ and $H_2$ respectively denote a magnetic field strength in the first magnetic island and the second magnetic island of the island pair of the island group G(m), wherein $\phi_1$ and $\phi_2$ respectively denote a magnetic field angle with respect to the X direction in the first magnetic island and the second magnetic island, wherein $\alpha_1^*$ and $\alpha_2^*$ are a first tilt angle and a second tilt angle at which a magnetic hard axis of the first magnetic island and the second magnetic island are respectively oriented with respect to the X direction, and wherein at least one tilt angle of the first tilt angle $\alpha_1^*$ and the second tilt angle $\alpha_2^*$ is between −90 and 0 degrees. If an assist mechanism is used, then the relationship R will be impacted by the reduced switching field that results from the assist conditions determined in step 83, which will reduce the magnitude of the write current in each island pair to which the assist conditions reduces the switching field.

As discussed supra, the write current ±I that is sufficient for writing the magnetization state S(m) of +1 or −1 must be of sufficient magnitude to generate a magnetic field that exceeds the switching field of the single island. If an assist mechanism is used, then a write current of reduced magnitude (relative to the write current when an assist mechanism is not used) will be required to generate a magnetic field that exceeds the switching field in each single island.

In one embodiment, step 84 is performed after step 83 is performed.

In one embodiment, steps 83 and 84 are performed in a coupled manner that determines the magnetization reversal assist conditions and write currents together and in dependence on each other to generate the assist conditions/write current pairs of: [C(1), I(1)]; [C(2), I(2)]; . . . ; [C(M), I(M)].

Step 85 sequences the island groups for selectively writing their magnetization states. The island groups are sequenced in an order of $G(i_1), G(i_2), \ldots, G(i_M)$ such that the write current $I(i_m)$ corresponding to island group $G(i_m)$ does not change the magnetization state of island group $G(i_n)$ (n<m) for m=2, 3, . . . , M). Thus, step 84 generates a set of indexes $\{i_1, i_2, \ldots, i_M\}$ such that each index in the set of indexes maps to a unique integer in the set of integers{ 1, 2, . . . , M}. In one embodiment the indexes $i_1, i_2, \ldots, i_M$ satisfy the ordering relationships $i_1 < i_2 < \ldots < i_M$ or the ordering relationships $i_1 > i_2 > \ldots > i_M$.

In one embodiment in which no assist mechanism is used, step 85 generates the set of indexes $\{i_1, i_2, \ldots, i_M\}$ by sorting the magnitude of the write currents I(1), I(2), . . . , I(M) in descending order to satisfy $|I(i_1)| > |I(i_2)| \ldots > |I(i_M)|$.

In one embodiment in which a thermal assist mechanism is used, step 85 generates the set of indexes $\{i_1, i_2, \ldots, i_M\}$ by sorting the temperatures T(1), T(2), . . . , T(M) in descending order to satisfy $T(i_1) > T(i_2) \ldots > T(i_M)$.

Step 86 applies the write currents in the sequential order of $I(i_1), I(i_2), \ldots, I(i_M)$, to the magnetic write head moving in the X direction, to generate the magnetization states $S(i_1), S(i_2), \ldots, S(i_M)$ for the island groups of $G(i_1), G(i_2), \ldots, G(i_M)$, respectively. For m=1, 2, . . . , M−1. the write current $I(i_m)$ may change one or more of the magnetization states $S(i_k)$ (m<k≦M), which does not matter. What is important is that the write current $I(i_m)$ writes the magnetization state $S(i_m)$ selected in step 82. It is also required that the write current $I(i_m)$ does not change the magnetization state of island group $G(i_n)$ (n<m) for m=2, 3, . . . , M).

If an assist mechanism is used, step 86 applies: the write current $I(i_1)$ with the assist mechanism at the condition $C(i_1)$, the write current $I(i_2)$ at the assist condition $C(i_2)$, . . . , the write current $I(i_M)$ at the assist condition $C(i_M)$.

Thus, the method of FIG. 13 is subject to constraints on the islands in the island groups G(1), G(2), . . . , G(M) selected in step 81 and the corresponding magnetization states S(1), S(2), . . . , S(M) selected in step 82, in light of the switching fields of the islands in the M island groups (which may be reduced if an assist mechanism is used). These constraints cause a condition of the write current $I(i_m)$ not changing the magnetization state of island group $G(i_n)$ (n<m) for m=2, 3, . . . , M).

In one embodiment, the island groups G(1), G(2), . . . , G(M) and corresponding magnetization states S(1), S(2), . . , S(M) are selected in steps 81 and 82 in such a manner the aforementioned condition is consequently satisfied, without a need for sorting the write currents in step 85 if no assist mechanism is used, and without a need for sorting the assist conditions in step 85 if an assist mechanism is used. In this embodiment, $i_1=1, i_2=2, \ldots, i_M=M$.

Figure 14:
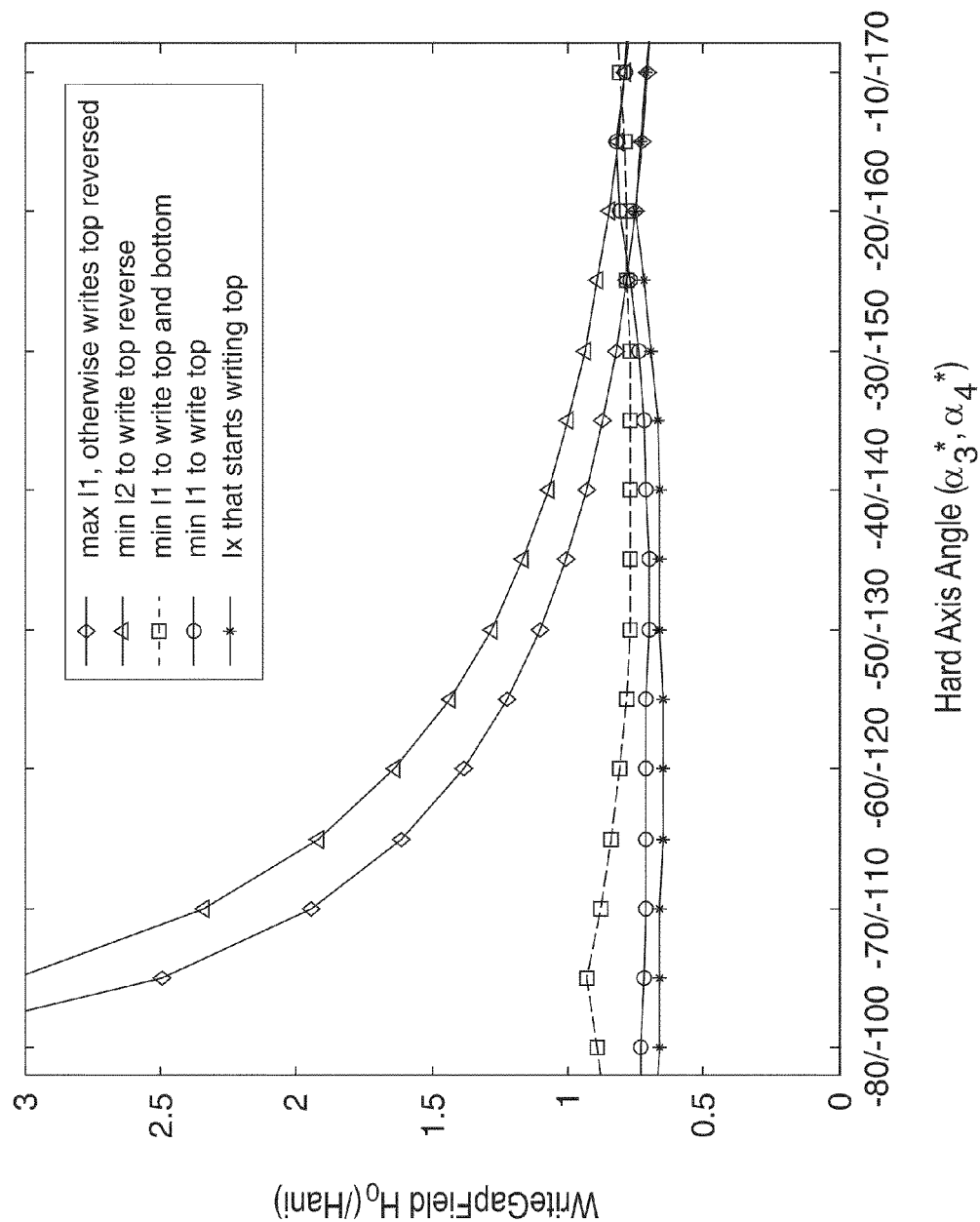
FIG. 14 is a plot of write gap field versus hard axis angles for a first island pair for an illustrative example of writing a patterned magnetic medium, in accordance with embodiment of the present invention.
Figure 15:
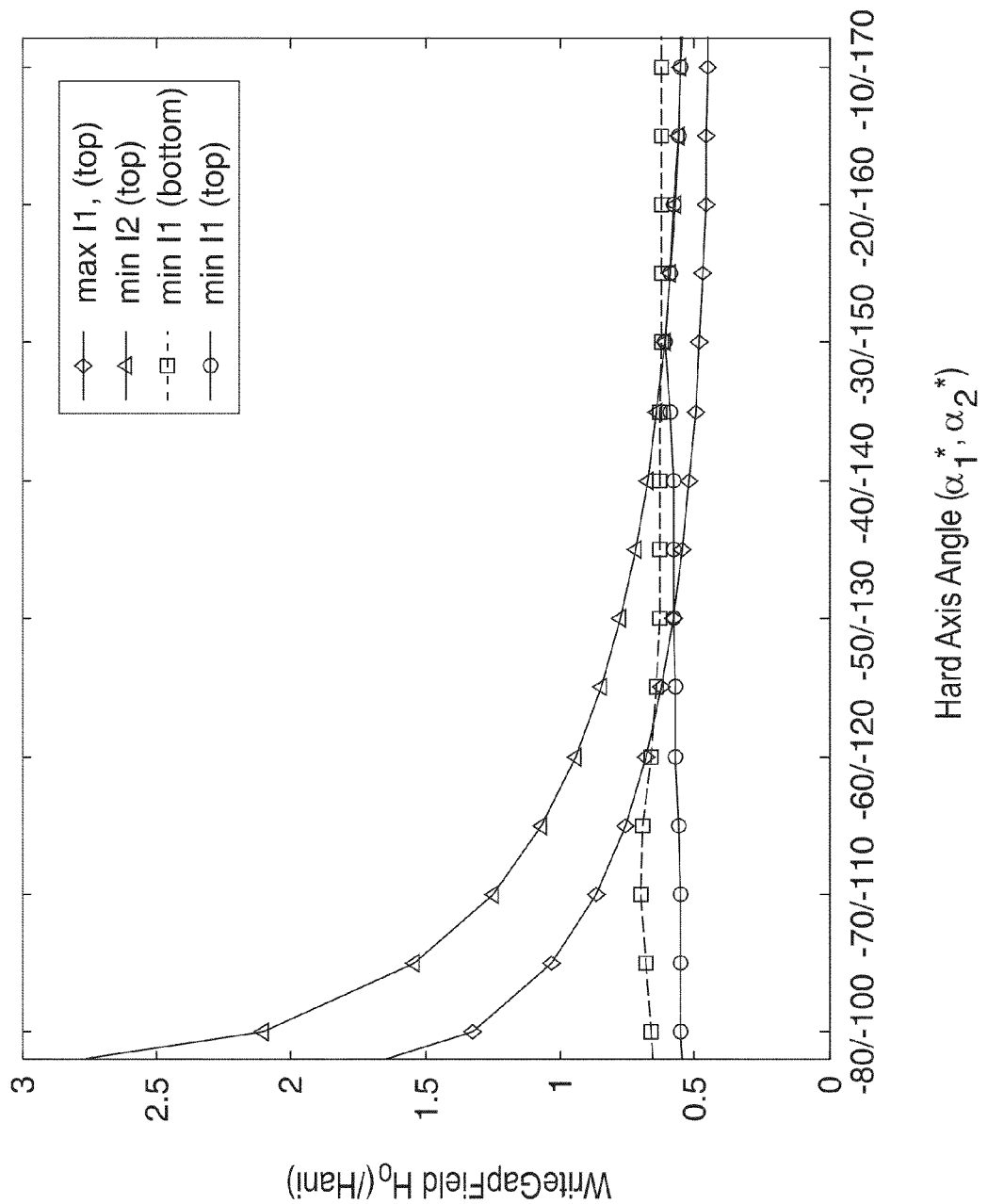
FIG. 15 is a plot of write gap field versus hard axis angles for a second island pair for the illustrative example of FIG. 14, in accordance with embodiment of the present invention.

The following discussion employs FIGS. 14-16 to describe an illustrative example of writing a patterned medium that has four islands per pillar, in accordance with embodiment of the present invention. The four islands are denoted as L(1), L(2), L(3), and L(4) as depicted in FIG. 12. Each island in each pillar is 10 nm thick in the Z direction. Each pillar is 50 nm wide and the pillars are 250 nm apart, which defines a pillar period of 300 nm. This pillar period of 300 nm is chosen for increased clarity in FIGS. 14-18. In particular, the pillars are spaced apart by 250 nm for clarity of the readback waveform. An assist mechanism is not used in this illustrative example.

The spacer layer 16 between island L(1) and island L(2) is 2 nm thick, the spacer layer 16 between 2 and 3 is 6 nm thick, and the spacer layer 16 between island L(3) and island 4 is 2 nm thick. All four islands have a same magnetization per unit volume. The anisotropy field Ha(1), Ha(2), Ha(3), Ha(4) of islands L(1), L(2), L(3), and L(4) normalized to a specified reference field $H_{ref}$ are $Ha(1)/H_{ref}=Ha(2)/H_{ref}=1$ and $Ha(3)/H_{ref}=Ha(4)/H_{ref}=1.5$. The hard axis angle are −60, −120, −45, −135 degrees for the islands L(1), L(2), L(3), L(4) respectively.

The patterned medium is recorded (write/read) with standard write/shielded MR read heads that are moving over the media. The calculation write/read process uses a head/media spacing of 10 nm, a write gap of 200 nm, and a read gap of 100 nm. Karlqvist head fields are used for the calculation of the fields from the writer used to write the medium and for the calculation of the readback signal from the shielded MR reader of the written medium.

The selection of the write current per pair was described supra for the N=2 case. It is a choice between +I1, +I2, −I1, −I2 to write the recording state A, B, C, or D for that particular pair: A is [1; 1]. B is [1; −1]. C is [−1; 1]. D is [−1; −1]. The amplitude of I1 and I2 depend on the magnetic properties of the islands, the head-islands spacing, and the write and read head characteristics.

The current calculation as a function of hard axis angle for the geometry considered in this illustrative example is with respect to FIGS. 14 and 15.

FIG. 14 is a plot of write gap field versus hard axis angles ($\alpha_3^*, \alpha_4^*$) for the island pair P(1) consisting of islands L(3) and L(4) in the illustrative example, in accordance with embodiment of the present invention. The following parameter values are used with subscripts 3 and 4 pertaining to islands L(3) and island L(4), respectively: $\alpha_3^*=-45$ and $\alpha_4^*=-135$ degrees, head-top of island 3 spacing 38 nm, $T_3=10$ nm, $R_3=2$ nm, and $T_4=10$ nm, wherein $R_3$ denotes the magnetic spacer layer 16 thickness in the Z direction between islands 3 and 4, and wherein $T_3$ and $T_4$ denote the thickness of island 3 and island 4, respectively, in the Z direction.

FIG. 15 is a plot of write gap field versus hard axis angles ($\alpha_1^*$, $\alpha_2^*$) for the island pair consisting of islands L(1) and L(2) in the illustrative example, in accordance with embodiment of the present invention. The following parameter values are used with subscripts 1 and 2 pertaining to island L(1) and island L(2), respectively: $\alpha_1^* = -60$ and $\alpha_2^* = -120$ degrees, head media spacing 10 nm, $R_1 = 10$ nm, $S_1 = 2$ nm, and $T_2 = 10$ nm, wherein $R_1$ denotes the magnetic spacer layer 16 thickness in the Z direction between islands 1 and 2, and wherein $T_1$ and $T_2$ denote the thickness of island 1 and island 2, respectively, in the Z direction.

Table 1 infra presents additional information for the present illustrative example.

TABLE 1

|  | Island Pair L(1) and L(2)<br>$\alpha_1^* = -60, \alpha_2^* = -120$<br>Ha(1) = Ha(2) = Href | Island Pair L(3) and L(4)<br>$\alpha_3^* = -45, \alpha_4^* = -135$<br>Ha(3) = Ha(4) = 1.5* Href | |
|---|---|---|---|
| min I1 to write top most island of group of islands |  | 0.66* Ha(3) | 0.99* Href |
| min I1 to fully write top island of group of islands | 0.57* Href | 0.7* Ha(3) | 1.05* Href |
| min I1 to fully write top and bottom islands of group of islands | 0.66* Href | 0.77* Ha(3) | 1.16* Href |
| max I1; otherwise start writing top island of group of islands in the reverse direction | 0.68* Href | 1.01* Ha(3) | 1.51* Href |
| min I2 to write top island of group of islands in the reverse direction | 0.94* Href | 1.16* Ha(4) | 1.75* Href |

The information in Table 1 can be used to derive the write currents as follows.

For the pair of islands L(3) and L(4), I1=1.2*Iref and I2=1.8*Iref, with Iref the current corresponding to a field in the writer gap of Href.

For the pair of islands L(1) and L(2), I1=0.67*Iref and I2=0.95*Iref, with Iref the current corresponding to a deep gap file of Href.

For the present illustrative example, the method described in FIG. 13 is used to write magnetization states in one pillar as follows.

Step 81 selects the M island groups as consisting of the two island pairs, namely G(1) and G(2), wherein G(1) consists of islands L(3) and L(4), wherein G(2) consists of islands L(1) and L(2), and wherein P=2. Q=0. M=2. and N=4.

Step 82 selects the desired magnetization state S(1) and S(2) corresponding to groups G(1) and G(2), respectfully, in the pillar that contains the 4 magnetic islands.

Step 83 is not performed, because no assist mechanism is used in this illustrative example.

Step 84 determines the write currents I(1) and I(2) corresponding to groups G(1) and G(2), respectfully. In this illustrative example, I(1)>I(2).

This illustrative example employs a strategy of writing the magnetization states in an order of decreasing write current. Thus, since I(1)>I(2), the island groups G(1) and G(2) are already sequenced in the correct order, so that the island group sequencing step 85 does not have to be performed.

Step 86 first writes the magnetization state S(1) for island group G(1) using write current I(1), which writes magnetization states for island groups G(1) and G(2). However, the written magnetization state for group G(2) is unimportant. What is important is that the correct magnetization state S(1) is written for island group G(1).

Next, step 86 writes the magnetization state S(2) for island group G(2) using write current I(2), which does not write any magnetization state for island group G(1) because I(1)>I(2).

In this illustrative example, S(1)=[−1; 1] and S(2)=[1; 1]. Thus, islands L(3), L(4), L(1), and L(2) are written to a magnetic state of −1, 1, 1. and 1. respectively. In a first pass of the write head, the write current I(1) of 1.8*Iref is applied which writes the island group G(1) to the magnetization state S(1)=[−1,1] and also writes the island group G(2) in a magnetization state which does not matter. What matters is that the island group G(1) is written to its correct magnetization state of S(1)=[−1,1]. In a second pass of the write head, the write current I(2) of 0.67*Iref is applied which writes the island group G(2) to the magnetization state S(2)=[1,1] and does not affect by design the magnetization state of island group G(1) since I(1)>I(2).

Figure 16A:
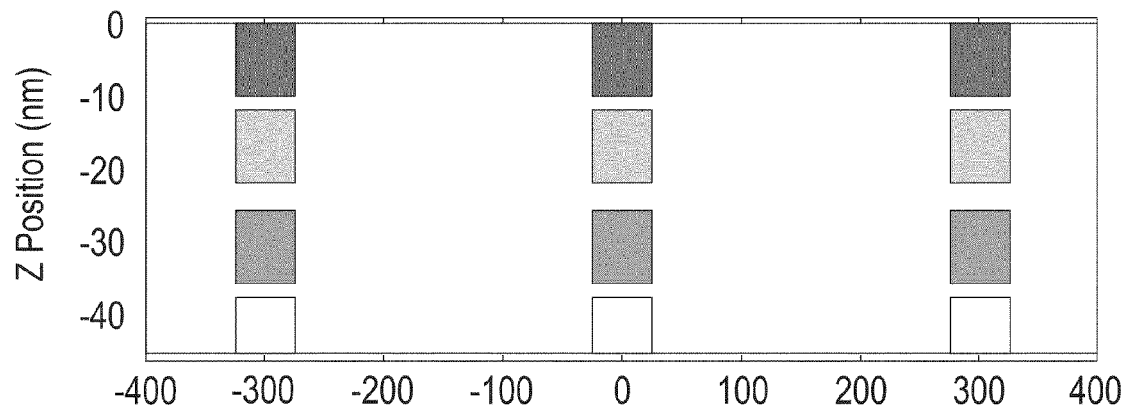
FIGS. 16A, 16B, and 16C depict the patterned magnetic medium being written for the illustrative example of FIGS. 14-15, in accordance with embodiments of the present invention.
Figure 16B:
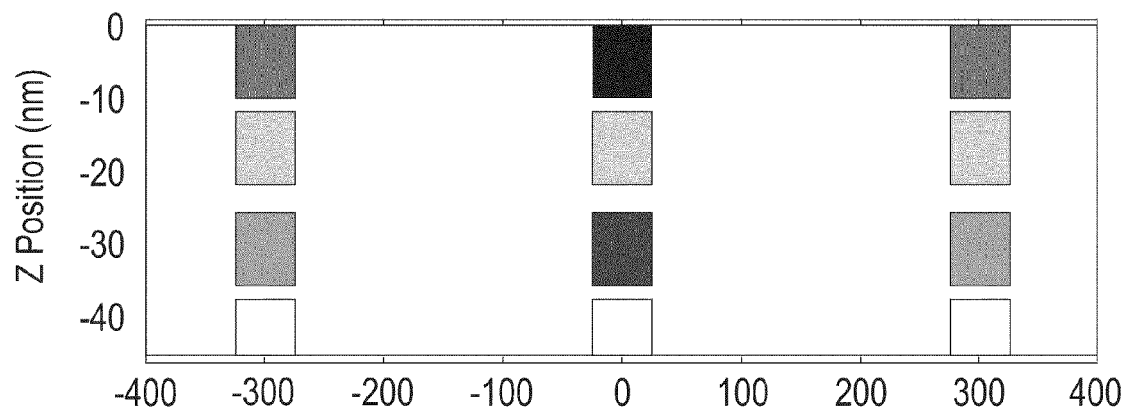
Figure 16C:
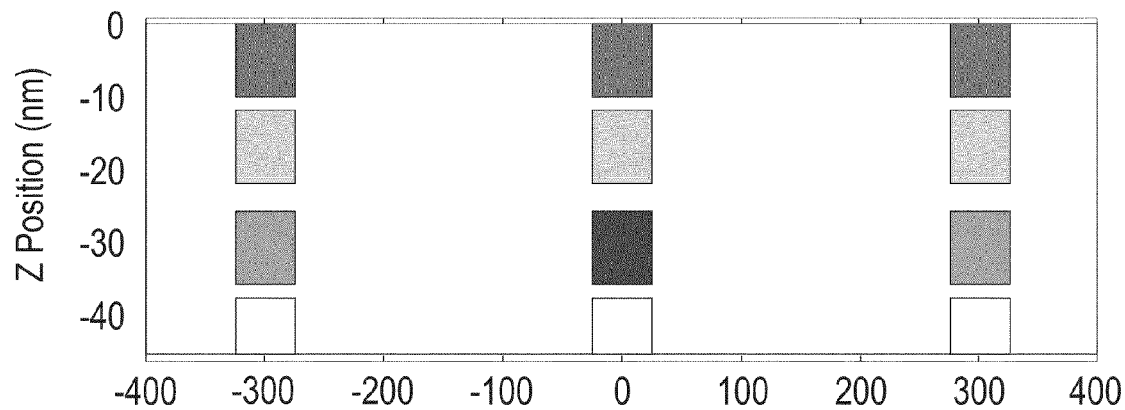

FIGS. 16A, 16B, and 16C (collectively, "FIG. 16") depict the patterned medium being written in the illustrative example, in accordance with embodiments of the present invention. FIG. 16A depicts the patterned medium before being written. FIG. 16B depicts the patterned medium after the write current I(1) is applied and before the write current I(2) is applied. FIG. 16C depicts the patterned medium after the write current I(2) is applied.

For reading a readback waveform that characterizes a magnetization state $[S_1; S_2; \ldots; S_N]$ in a pillar that contains N magnetic islands, the magnetization state $[S_1; S_2; \ldots; S_N]$ is probed with a sensitive magnetic reader, typically a magnetoresistive head, wherein $S_m$ denotes the magnetic state of island m (m=1, 2, . . . , N). For each island m that has been written as part of an island pair, the magnetic state $S_m$ is the magnetic state S1 or S2 as explained supra. For each island m that has been written as a single island, the magnetic state $S_m$ is +1 or −1 as explained supra. The amplitude level and the pulse shape of the readback waveform must be different for all possible recorded magnetization states, which is accomplished by design of the patterned magnetic medium. The magnetization state $[S_1; S_2; \ldots; S_N]$ of the pillar is thus identified from the amplitude and shape of the readback waveform, as described in the method of FIG. 17 which represents a generalization of the method of FIG. 11.

Figure 17:
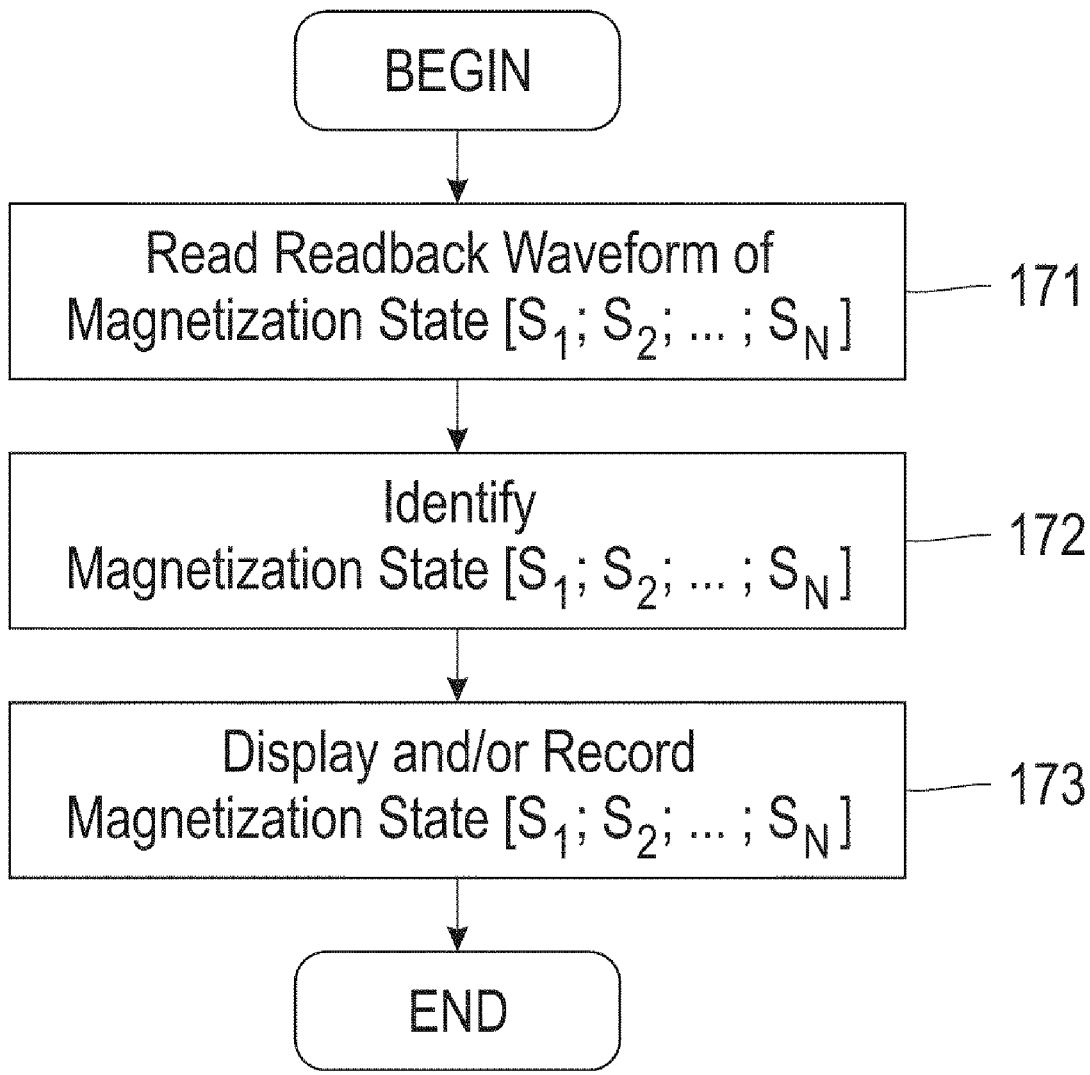
FIG. 17 is a flow chart of a method for reading magnetization states from the multi-level patterned magnetic medium of FIG. 12, in accordance with embodiments of the present invention.

FIG. 17 is a flow chart of a method for reading magnetization states from the multi-level patterned magnetic medium of FIG. 12 having N islands in each pillar, in accordance with embodiments of the present invention. The method described in FIG. 17, which assumes that N≧3. M≧2. N=2P+Q, P≧1, and Q≧0. comprises steps 171-173. In one embodiment, Q=0. In one embodiment, Q=0 and M=N/2 or (N−1)/2 if N is even or odd, respectively. In one embodiment, Q≧1. In one embodiment, P≧2.

Step 171 reads, by a magnetic read head moving in the X direction, a readback waveform (W) specific to the magnetization state $[S_1; S_2; \ldots; S_N]$ in a pillar of FIG. 12. Each island pair of the P island pairs in the pillar comprises two magnetic islands of the N magnetic islands of the pillar. Each such island pair in the pillar comprises a magnetic state S1 in a first magnetic island of the two magnetic islands and a magnetic state S2 in a second magnetic island of the two magnetic islands of the pillar, wherein S1 and S2 are each selected from the group consisting of $S_1, S_2, \ldots, S_N$. The first magnetic island and the second magnetic island have a magnetic easy axis respectively oriented at a first tilt angle ($\alpha_1$) and a second tilt angle ($\alpha_2$) with respect to the X direction, wherein $\alpha_1$ and $\alpha_2$ satisfy a condition selected from the group consisting of $\alpha_1 \neq \alpha_2$, either or both of $\alpha_1$ and $\alpha_2$ differing from 0, 90, 180. and 270 degrees, and combinations thereof. The first magnetic layer and the second magnetic layer have a magnetic hard axis respectively oriented at a first tilt angle ($\alpha_1^*$) and a second tilt angle ($\alpha_2^*$) with respect to the X direction. In one embodiment, at least one tilt angle of the two tilt angles ($\alpha_1^*$) and ($\alpha_2^*$) is between −90 and 0 degrees Step 172 decodes the readback waveform W from step 171 to identify the magnetization state $[S_1; S_2; \ldots; S_N]$ from the readback waveform W resulting from said reading.

Step 173 displays and/or records the magnetization state $[S_1; S_2; \ldots; S_N]$ identified in step 172. For example, the information state corresponding to the readback waveform W may be displayed on a display device of the computer system 90 of FIG. 19 and/or recorded (i.e., written) in a memory device of the computer system 90 of FIG. 19.

In one embodiment, steps 171-173 may be implemented in software via the computer system 90 of FIG. 19. In step 171, the software executes issuing a command for reading, by the magnetic read head, the readback waveform W (which causes the magnetic read head to read the readback waveform W). In step 172, the software decodes the readback waveform W to identify the magnetization state $[S_1; S_2; \ldots; S_N]$. In step 173, the software executes displaying the magnetization state $[S_1; S_2; \ldots; S_N]$ identified in step 172.

For a pillar comprising 4 islands (N=4), $2^4$ (i.e., 16) readback waveforms, which are well distinguished from each other and are associated with 16 corresponding magnetization states, may be used to identify a particular magnetization state when one of the 16 readback waveforms is read by a read head. FIGS. 17A and 17B (collectively, "FIG. 17") depict 16 such readback waveforms for the N=4 case, in accordance with embodiments of the present invention.

Figure 18A:
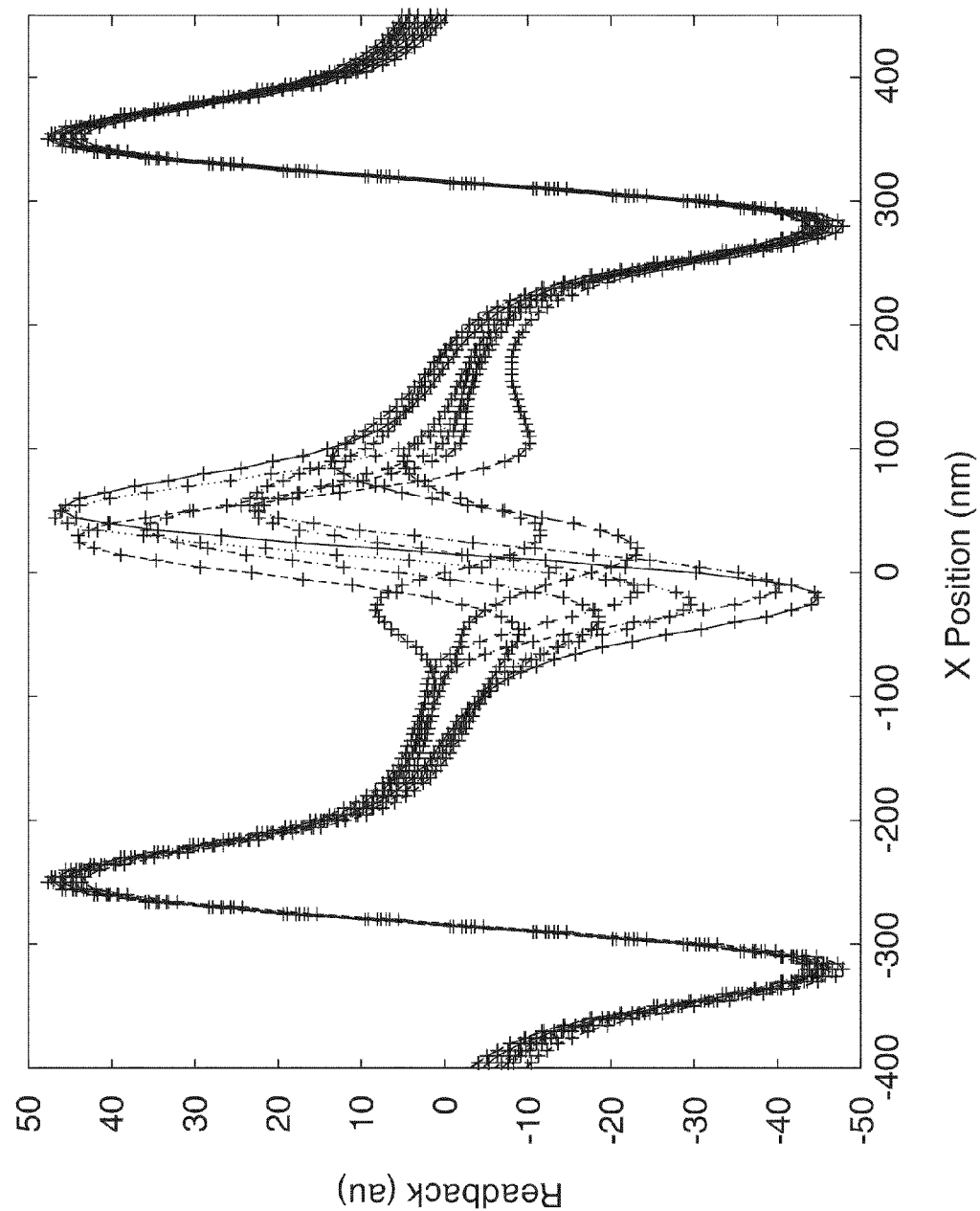
FIGS. 18A and 18B depict readback waveforms for a pillar with 4 magnetic islands, in accordance with embodiments of the present invention.

FIG. 18A depicts for a central pillar with 4 magnetic islands the following 8 magnetization states which are well distinguished from each other: [1;1;1;1], [1;1;1;−1], [1;1;−1;1], [1;−1;1;1], [−1;1;1;1], [1;−1;1;−1], [1;1;−1;−1], [−1;1;1;−1]. The pillars before and after are fixed at the magnetization state [1;1;1;1].

Figure 18B:
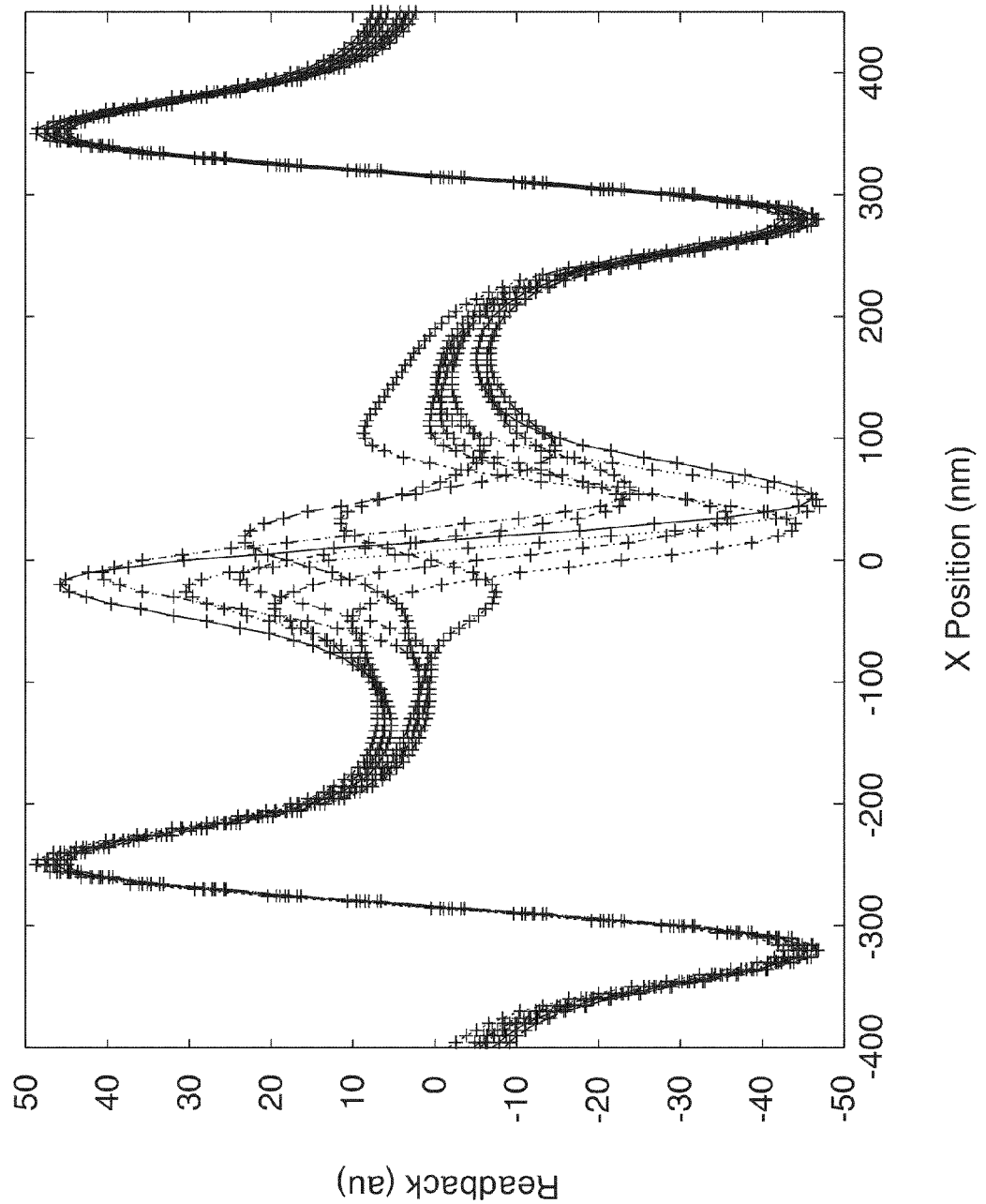

FIG. 18B depicts for the central pillar with 4 magnetic islands the following 8 magnetization states which are well distinguished from each other and from the 8 magnetization states of FIG. 18A: [−1;−1;−1;−1], [−1;−1;−1;1], [−1;−1;1;1], [−1;1;−1;−1], [1;−1;−1;1], [−1;1;−1;1], [−1;−1;1;1], [1;−1;−1;1]. The pillars before and after are fixed at the magnetization state [1;1;1;1].

FIG. 19 illustrates a computer system 90 used for executing software to implement the methodology of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be at least one of, inter alia, a printer, a plotter, a computer screen, a magnetic tape, a removable hard disk, a floppy disk, etc. The memory devices 94 and 95 may be at least one of, inter alia, a hard disk, a floppy disk, a magnetic tape, an optical storage such as a compact disc (CD) or a digital video disc (DVD), a random access memory (RAM), a dynamic random access memory (DRAM), a read-only memory (ROM), etc. The memory device 95 includes a computer code 97. The computer code 97 comprises software to implement the methodology of the present invention. The processor 91 executes the computer code 97. The memory device 94 includes input data 96. The input data 96 includes input required by the computer code 97. The output device 93 stores or displays output from the computer code 97. Either or both memory devices 94 and 95 (or one or more additional memory devices not shown in FIG. 19) may be used as a computer usable storage medium (or a computer readable storage medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable storage medium (or said program storage device).

In one embodiment, an apparatus of the present invention comprises the computer program product. In one embodiment, an apparatus of the present invention comprises the computer system such that the computer system comprises the computer program product.

While FIG. 19 shows the computer system 90 as a particular configuration of hardware and software, any configuration of hardware and software, as would be known to a person of ordinary skill in the art, may be utilized for the purposes stated supra in conjunction with the particular computer system 90 of FIG. 19. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for writing magnetization states in a multi-level patterned magnetic medium comprising a plurality of pillars distributed in an X direction and a Y direction which are orthogonal to each other and define an X-Y plane, consecutive pillars of the plurality of pillars separated by non-magnetic material, each pillar comprising N magnetic islands distributed along a Z direction orthogonal to the X-Y plane, said N magnetic islands denoted as L(1), L(2), . . . , L(N), said N at least 3, said method comprising:

selecting M island groups denoted as G(1), G(2), . . . , G(M) from the N magnetic islands in a first pillar of the plurality of pillars, said M island groups consisting of P island pairs and Q single islands, wherein $2 \leq M \leq N-1$, $P \geq 1$, and $Q \geq 0$;

selecting magnetization states S(1), S(2), . . . , S(M) corresponding to the island groups G(1), G(2), . . . , G(M), respectively, for each island group G(m) (m=1, 2, . . . , or M) consisting of an island pair, the magnetization state S(m) is denoted as [S1; S2](m), wherein S1 and S2 are a first and second magnetic state in a first and second magnetic island, respectively, of the island pair, wherein $\alpha_1^*$ and $\alpha_2^*$ are a first tilt angle and a second tilt angle at which a hard axis of the first magnetic island and the second magnetic island are respectively oriented with respect to the X direction, and wherein either or both of $\alpha_1^*$ and $\alpha_2^*$ are in a range of 0 to −90 degrees;

for each island group G(m') (m'=1, 2, . . . , or M) consisting of a single island, the magnetization state S(m') is +1 or −1 if the magnetization is oriented at or opposite to, respectively, a tilt angle ($\alpha$) at which an easy axis of the single island is oriented with respect to the X direction;

determining write currents I)(1), I(2), . . . , I(M) sufficient to write the magnetization states S(1), S(2), . . . , S(M), respectively;

for a set of indexes $\{i_1, i_2 \ldots, i_M\}$ such that each index maps to a unique integer in the set of integers $\{1, 2, \ldots, M\}$, applying the write currents in a sequential order of $I(i_1)$, $I(i_2), \ldots, I(i_M)$ to a magnetic write head moving in the X direction, resulting in generating the magnetization states $S(i_1), S(i_2), \ldots, S(i_M)$ for the island groups of $G(i_1), G(i_2), \ldots, G(i_M)$, respectively, wherein the write current $I(i_m)$ corresponding to island group $G(i_m)$ does not change the magnetization state of island group $G(i_n)$ (n<m) for m=2, 3, . . . , M, and wherein for each island group G(m) consisting of said island pair, said generating comprises said magnetic write head writing the magnetization state [S1; S2](m) by simultaneously writing the magnetic states S1 and S2.

2. The method of claim 1, wherein the method further comprises:

after said determining write currents and before said applying the write currents, generating the set of indexes $\{i_1, i_2 \ldots, i_M\}$ by sorting the magnitude of the write currents I(1), I(2), . . . , I(M) in descending order to satisfy $|I(i_1)|>|I(i_2)|\ldots>|I(i_M)|$.

3. The method of claim 1, wherein the method further comprises after said selecting magnetization states and not after said determining write currents, determining assist conditions C(1), C(2), . . . , C(M) that would result from applying energy to the island groups G(1), G(2), . . . , G(M), respectively, to assist magnetization reversal; and wherein said applying the write currents comprises applying: the write current $I(i_1)$ at the assist condition $C(i_1)$, the write current $I(i_2)$ at the assist condition $C(i_2)$, . . . , the write current $I(i_M)$ at the assist condition $C(i_M)$.

4. The method of claim 3, wherein said determining write currents is performed after said determining assist conditions is performed.

5. The method of claim 3, wherein said determining assist conditions and said determining write currents are performed in a coupled manner that determines the assist conditions and write currents together and in dependence on each other to generate assist conditions/write current pairs of: [C(1), I(1)]; [C(2), I(2)]; . . . ; [C(M), I(M)].

6. The method of claim 3, wherein said applying energy comprises applying heat to the island groups G(1), G(2), . . . , G(M) such that the conditions C(1), C(2), . . . , C(M) are temperatures T(1), T(2), . . . , T(M) applied to the island groups G(1), G(2), . . . , G(M) , respectively, and wherein the method further comprises:

after said determining write currents and before said applying the write currents, generating the set of indexes $\{i_1, i_2 \ldots, i_M\}$ by sorting the temperatures T(1), T(2), . . . , T(M) in descending order to satisfy $T(i_1) > T(i_2) \ldots > T(i_M)$.

7. The method of claim 3, wherein said applying energy comprises applying microwave energy to the island groups G(1), G(2), . . . , G(M).

8. The method of claim 1, wherein P≧2.

9. A method for reading magnetization states from a multi-level patterned magnetic medium comprising a plurality of pillars distributed in an X direction and a Y direction which are orthogonal to each other and define an X-Y plane, consecutive pillars of the plurality of pillars separated by non-magnetic material, each pillar comprising N magnetic islands distributed along a Z direction orthogonal to the X-Y plane, said N magnetic islands denoted as L(1), L(2), . . . , L(N), said N at least 3, said method comprising:

reading, by a magnetic read head moving in the X direction, a readback waveform (W) specific to a magnetization state $[S_1; S_2; \ldots ; S_N]$ comprising magnetic states $S_1, S_2, \ldots, S_N$ in islands L(1), L(2), . . . , L(N), respectively, in a first pillar of the plurality of pillars, said N magnetic islands in the first pillar comprising M island groups denoted as G(1), G(2), . . . , G(M), said N magnetic islands consisting of P island pairs and Q single islands, wherein N=2P+Q, M≧2, P≧1, and Q≧0, wherein each island pair in the first pillar comprises two magnetic islands of the N magnetic islands of the first pillar, wherein each island pair in the first pillar comprises a magnetic state S1 in a first magnetic island of the two magnetic islands and a magnetic state S2 in a second magnetic island of the two magnetic islands of the pillar, wherein S1 and S2 are each selected from the group consisting of $S_1, S_2, \ldots, S_N$, wherein the first magnetic island and the second magnetic island have a magnetic easy axis respectively oriented at a first tilt angle ($\alpha_1$) and a second tilt angle ($\alpha_2$) with respect to the X direction, wherein $\alpha_1$ and $\alpha_2$ satisfy a condition selected from the group consisting of 1) $\alpha_1 \neq \alpha_2$, 2) either or both of $\alpha_1$ and $\alpha_2$ differing from 0, 90, 180, and 270 degrees, and 3) combinations thereof, and wherein the first magnetic island and the second magnetic island have a magnetic hard axis respectively oriented at a first tilt angle ($\alpha_1^*$) and a second tilt angle ($\alpha_2^*$) with respect to the X direction;

identifying the magnetization state $[S_1; S_2; \ldots ; S_N]$ by decoding the readback waveform W resulting from said reading; and displaying and/or recording the magnetization state $[S_1; S_2; \ldots ; S_N]$, wherein the magnetic state S1 and the magnetic state S2 is each a state A=[+1, +1], a state B=[−1, −1], a state C=[+1,−1], or a state D=[−1,+1], wherein the magnetic state S1 is respectively +1 or −1 if a magnetization of the first magnetic island is oriented at or opposite to the angle $\alpha_1$, and wherein the magnetic state S2 is respectively +1 or −1 if a magnetization of the second magnetic island is oriented at or opposite to the angle $\alpha_2$.

10. An apparatus comprising a computer program product, said computer program product comprising a computer readable storage medium having a computer readable program code stored therein, said computer readable program code containing instructions that when executed by a processor of a computer system implement a method for writing magnetization states in a multi-level patterned magnetic medium comprising a plurality of pillars distributed in an X direction and a Y direction which are orthogonal to each other and define an X-Y plane, consecutive pillars of the plurality of pillars separated by non-magnetic material, each pillar comprising N magnetic islands distributed along a Z direction orthogonal to the X-Y plane, said N magnetic islands denoted as L(1), L(2), . . . , L(N), said N at least 3, said method comprising:

selecting M island groups denoted as G(1), G(2), . . . , G(M) from the N magnetic islands in a first pillar of the plurality of pillars, said M island groups consisting of P island pairs and Q single islands, wherein 2≦M≦N−1, P≧1, and Q≧0;

selecting magnetization states S(1), S(2), . . . , S(M) corresponding to the island groups G(1), G(2), . . . , G(M), respectively, for each island group G(m) (m=1, 2, . . . , or M) consisting of an island pair, the magnetization state S(m) is denoted as [S1; S2](m), wherein S1 and S2 are a first and second magnetic state in a first and second magnetic island, respectively, of the island pair, wherein $\alpha_1^*$ and $\alpha_2^*$ are a first tilt angle and a second tilt angle at which a hard axis of the first magnetic island and the second magnetic island are respectively oriented with respect to the X direction, and wherein either or both of $\alpha_1^*$ and $\alpha_2^*$ are in a range of 0 to −90 degrees;

for each island group G(m') (m'=1, 2, . . . , or M) consisting of a single island, the magnetization state S(m') is +1 or −1 if the magnetization is oriented at or opposite to, respectively, a tilt angle ($\alpha$) at which an easy axis of the single island is oriented with respect to the X direction;

determining write currents I(1), I(2), . . . , I(M) sufficient to write the magnetization states S(1), S(2), . . . , S(M), respectively;

for a set of indexes {$i_1, i_2 \ldots, i_M$} such that each index maps to a unique integer in the set of integers{1, 2, . . . , M}, applying the write currents in a sequential order of I($i_1$), I($i_2$), . . . , I($i_M$) to a magnetic write head moving in the X direction, resulting in generating the magnetization states S($i_1$), S($i_2$), . . . , S($i_M$) for the island groups of G($i_1$), G($i_2$), . . . , G($i_M$), respectively, wherein the write current I($i_m$) corresponding to island group G($i_m$) does not change the magnetization state of island group G($i_n$) (n<m) for m=2, 3, . . . , M), and wherein for each island group G(m) consisting of said island pair, said generating comprises said magnetic write head writing the magnetization state [S1; S2](m) by simultaneously writing the magnetic states S1 and S2.

11. The apparatus of claim 10, wherein the apparatus comprises the computer system, and wherein the computer system comprises the computer program product.

12. The apparatus of claim 10, wherein the method further comprises:

after said determining write currents and before said applying the write currents, generating the set of indexes {$i_1, i_2 \ldots, i_M$} by sorting the magnitude of the write currents I(1), I(2), . . . , I(M) in descending order to satisfy |I($i_1$)|>|I($i_2$)|. . . >|I($i_M$)|.

13. The apparatus of claim 10, wherein the method further comprises after said selecting magnetization states and not after said determining write currents, determining assist conditions C(1), C(2), . . . , C(M) that would result from applying energy to the island groups G(1), G(2), . . . , G(M), respectively, to assist magnetization reversal; and wherein said applying the write currents comprises applying: the write current I($i_1$) at the assist condition C($i_1$), the write current I($i_2$) at the assist condition C($i_2$), . . . , the write current I($i_M$) at the assist condition C($i_M$).

14. The apparatus of claim 13, wherein said determining write currents is performed after said determining assist conditions is performed.

15. The apparatus of claim 13, wherein said determining assist conditions and said determining write currents are performed in a coupled manner that determines the assist conditions and write currents together and in dependence on each other to generate assist condition/write current pairs of: [C(1), I(1)]; [C(2), I(2)]; . . . ; [C(M), I(M)].

16. The apparatus of claim 13, wherein said applying energy comprises applying heat to the island groups G(1), G(2), . . . , G(M) such that the conditions C(1), C(2), . . . , C(M) are temperatures T(1), T(2), . . . , T(M) applied to the island groups G(1), G(2), . . . , G(M), respectively, and wherein the method further comprises:

after said determining write currents and before said applying the write currents, generating the set of indexes {$i_1, i_2 \ldots, i_M$} by sorting the temperatures T(1), T(2), . . . , T(M) in descending order to satisfy T($i_1$)>T($i_2$) . . . >T($i_M$).

17. The apparatus of claim 13, wherein said applying energy comprises applying microwave energy to the island groups G(1), G(2), . . . , G(M).

18. The apparatus of claim 10, wherein P≧2.

19. An apparatus comprising a computer program product, said computer program product comprising a computer readable storage medium having a computer readable program code stored therein, said computer readable program code containing instructions that when executed by a processor of a computer system implement a method for reading magnetization states from a multi-level patterned magnetic medium comprising a plurality of pillars distributed in an X direction and a Y direction which are orthogonal to each other and define an X-Y plane, consecutive pillars of the plurality of pillars separated by non-magnetic material, each pillar comprising N magnetic islands distributed along a Z direction orthogonal to the X-Y plane, said N magnetic islands denoted as L(1), L(2), . . . , L(N), said N at least 3, said method comprising:

reading, by a magnetic read head moving in the X direction, a readback waveform (W) specific to a magnetization state [$S_1; S_2; \ldots; S_N$] comprising magnetic states $S_1, S_2, \ldots, S_N$ in islands L(1), L(2), . . . , L(N), respectively, in a first pillar of the plurality of pillars, said N magnetic islands in the first pillar comprising M island groups denoted as G(1), G(2), . . . , G(M), said N magnetic islands consisting of P island pairs and Q single islands, wherein N=2P+Q, M≧2, P≧1, and Q≧0, wherein each island pair in the first pillar comprises two magnetic islands of the N magnetic islands of the first pillar, wherein each island pair in the first pillar comprises a magnetic state S1 in a first magnetic island of the two magnetic islands and a magnetic state S2 in a second magnetic island of the two magnetic islands of the pillar, wherein S1 and S2 are each selected from the group consisting of $S_1, S_2, \ldots, S_N$, wherein the first magnetic island and the second magnetic island have a magnetic easy axis respectively oriented at a first tilt angle ($\alpha_1$) and a second tilt angle ($\alpha_2$) with respect to the X direction, wherein $\alpha_1$ and $\alpha_2$ satisfy a condition selected from the group consisting of 1) $\alpha_1 \neq \alpha_2$, 2) either or both of $\alpha_1$ and $\alpha_2$ differing from 0, 90, 180, and 270 degrees, and 3) combinations thereof, and wherein the first magnetic island and the second magnetic island have a magnetic hard axis respectively oriented at a first tilt angle ($\alpha_1^*$) and a second tilt angle ($\alpha_2^*$) with respect to the X direction;

identifying the magnetization state $[S_1; S_2; \ldots; S_N]$ by decoding the readback waveform W resulting from said reading; and displaying and/or recording the magnetization state $[S_1; S_2; \ldots; S_N]$, wherein the magnetic state S1 and the magnetic state S2 is each a state A=[+1, +1], a state B=[−1, −1], a state C=[+1,−1], or a state D=[−1,+1], wherein the magnetic state S1 is respectively +1 or −1 if a magnetization of the first magnetic island is oriented at or opposite to the angle $\alpha_1$, and wherein the magnetic state S2 is respectively +1 or −1 if a magnetization of the second magnetic island is oriented at or opposite to the angle $\alpha_2$.

20. The apparatus of claim 19, wherein the apparatus comprises the computer system, and wherein the computer system comprises the computer program product.

* * * * *